US008390911B2

(12) United States Patent
Tsuboi et al.

(10) Patent No.: US 8,390,911 B2
(45) Date of Patent: Mar. 5, 2013

(54) MICRO MOVABLE ELEMENT ARRAY AND A COMMUNICATION APPARATUS

(75) Inventors: Osamu Tsuboi, Kawasaki (JP); Norinao Kouma, Kawasaki (JP); Tsuyoshi Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/225,097

(22) Filed: Sep. 2, 2011

(65) Prior Publication Data

US 2012/0057214 A1    Mar. 8, 2012

Related U.S. Application Data

(63) Continuation of application No. PCT/JP2009/056645, filed on Mar. 31, 2009.

(51) Int. Cl.
*G02B 26/08* (2006.01)
*G02B 26/10* (2006.01)
*G02B 26/12* (2006.01)

(52) U.S. Cl. .................... 359/221.2; 359/212.1

(58) Field of Classification Search .... 359/196.1–226.3, 359/855, 290–295, 838, 846, 871, 872; 250/204, 250/559.06, 559.29, 230, 234; 347/255–260; 353/39, 98–99; 385/15–18, 22; 398/12, 398/19, 45
See application file for complete search history.

(56) References Cited

U.S. PATENT DOCUMENTS

| 2002/0075786 A1 | 6/2002 | Ikegame |
| 2004/0105616 A1 | 6/2004 | Kazama et al. |
| 2004/0168179 A1 | 8/2004 | Ikegame |
| 2005/0231787 A1 | 10/2005 | Tsuboi et al. |
| 2005/0231793 A1* | 10/2005 | Sato ............................. 359/291 |
| 2007/0236767 A1* | 10/2007 | Ko et al. ....................... 359/198 |
| 2008/0151345 A1* | 6/2008 | Zhou ............................ 359/224 |
| 2008/0239456 A1 | 10/2008 | Tsuboi et al. |
| 2009/0001847 A1 | 1/2009 | Tsuboi et al. |

FOREIGN PATENT DOCUMENTS

| JP | 2001-356282 A | 12/2001 |
| JP | 2002-189177 A | 7/2002 |
| JP | 2003-019700 A | 1/2003 |
| JP | 2004-004769 A | 1/2004 |

(Continued)

OTHER PUBLICATIONS

International Search Report of PCT/JP2009/056645, date of mailing May 26, 2009.

(Continued)

*Primary Examiner* — Alessandro Amari
*Assistant Examiner* — Kimberly N Kakalec
(74) *Attorney, Agent, or Firm* — Westerman, Hattori, Daniels & Adrian, LLP

(57) ABSTRACT

A micro movable element array includes a first frame; a second frame; a first movable part row including plural first movable parts and a second movable part row including plural second movable parts. The first movable parts include first movable main parts. The second movable parts include second movable main parts. The first and second frames are stacked such that the first and second movable part rows are opposed to each other. In the first movable part row, the first movable parts are located such that the first movable main parts are arranged in a first direction and the first movable main parts and gaps are disposed alternately. In the second movable part row, the second movable parts are located such that the second movable main parts are arranged in the first direction and the second movable main parts are opposed to the corresponding gaps.

6 Claims, 34 Drawing Sheets

FOREIGN PATENT DOCUMENTS

| | | |
|---|---|---|
| JP | 2004-341364 A | 12/2004 |
| JP | 2005-115177 A | 4/2005 |
| JP | 2005-305582 A | 11/2005 |
| JP | 2006-072252 A | 3/2006 |
| JP | 2008-246655 A | 10/2008 |
| JP | 2009-012082 A | 1/2009 |

OTHER PUBLICATIONS

Office Action dated Dec. 4, 2012 issued in corresponding Japanese Patent Application No. 2011-506878. English Translation.

* cited by examiner

MICRO MOVABLE ELEMENT ARRAY AND A COMMUNICATION APPARATUS

CROSS-REFERENCE TO RELATED APPLICATIONS

This is a U.S. continuation application filed under 35 USC 111 (a) claiming benefit under 35 USC 120 and 365 (c) based on International Application No. PCT/JP2009/056645, filed on Mar. 31, 2009, the entire contents of which are hereby incorporated by reference.

FIELD

The disclosures herein generally relate to a micro movable element array and a communication apparatus.

BACKGROUND

Recently, elements including minute structures formed by MEMS (micro electro mechanical systems) technique find wide application in various technical fields. The elements include micro movable elements including minute movable parts, such as a micro-mirror element, an angular velocity sensor, an acceleration sensor, etc. The micro-mirror element is utilized as an element which serves a light reflecting function, in the field of optical communication techniques or optical disk techniques, for example. The angular velocity sensor and the acceleration sensor are utilized for applications such as image stabilizing functions for video cameras or mobile phones with cameras, car navigation systems, airbag ignition timing system, attitude controlling systems of vehicles or robots, etc. Such micro movable elements are described in the following Patent Documents 1-4, for example.

[Patent Document 1] Japanese Laid-open Patent Publication No. 2003-19700

[Patent Document 2] Japanese Laid-open Patent Publication No. 2004-341364

[Patent Document 3] Japanese Laid-open Patent Publication No. 2005-305582

[Patent Document 4] Japanese Laid-open Patent Publication No. 2006-72252

FIGS. 39-41 depict an example of a related art micro movable element 90. FIG. 39 is a plane view of the micro movable element 90. FIGS. 40 and 41 depict sectional views along a line XL-XL and a line XLI-XLI in FIG. 39, respectively.

The micro movable element 90 includes a movable main part 91; a frame 92 surrounding the movable main part 91; a frame 93 surrounding the frame 92; a pair of torsion bars 94 coupling the movable main part 91 and the frame 92; and a pair of torsion bars 95 coupling the frame 92 and the frame 93. The pair of torsion bars 94 defines an axis B1 of rotation of the movable main part 91, and the pair of torsion bars 95 defines an axis B2 of rotation of the frame 92 and thus the movable main part 91. The axis B1 and the axis B2 intersect perpendicularly. In other words, the micro movable element 90 is a so-called oscillating element in two axes.

If the micro movable element 90 is configured as a micromirror element, for example, a mirror surface 91a is provided on the movable main part 91, and a predetermined first actuator (not illustrated) for generating a driving force for the rotation of the movable main part 91 around the axis B1 is provided. Further, a predetermined second actuator (not illustrated) for generating a driving force for the rotation of the frame 92 and thus the movable main part 91 around the axis B2 is provided. The movable main part 91 is driven to rotate or oscillate around the respective axes B1, B2 by operating the actuators as appropriate. Such driving oscillation of the movable main part 91 causes a reflecting direction in which an optical signal is reflected by the mirror surface 91a on the movable main part 91 be changed.

Further, if the micro movable element 90 is configured as an angular velocity sensor, opposed capacitance electrodes for detection (not illustrated) are provided as a pair on the movable main part 91 and the frame 92, respectively. The capacitance electrodes for detection have capacitances changed according to the rotation amount of the movable main part 91 around the axis B1, for example. Further, a predetermined actuator (not illustrated) for generating a driving force for the rotation of the frame 92 and thus the movable main part 91 around the axis B2 is provided. The actuator is operated to cause the frame 92 and thus the movable main part 91 to oscillate around the axis B2 at a predetermined frequency or cycle. When a predetermined angular velocity is applied to the movable main part 91 in such an oscillated state, the movable main part 91 rotates around the axis B1 and thus the capacitance between the capacitance electrodes for detection changes. The rotation amount of the movable main part 91 is detected based on the change in the capacitance, and the angular velocity applied to the movable main part 91 or the micro movable element 91 is derived based on the detection result.

According to the related art techniques, when a micro movable element array is configured by aligning plural micro movable elements 90 as described above in a row and sharing the frame 93 among the micro movable elements 90 to integrate them, it may be difficult to implement a sufficiently high population of the micro movable elements 91 in the element arranged direction. The reason is as follows.

The respective parts of the micro movable element array or the micro movable element 90 are formed from a material substrate using the MEMS technique. Thus, when an air gap is formed by penetrating the material substrate with a certain thickness, there is a limit to the minimum width of the air gap in term of processing technique. In other words, it may not be possible to reduce the spaced distances between the neighboring micro movable elements 90 of the micro movable element array below the processing limit. Therefore, it may not be possible to reduce the spaced distances between the movable main parts 91 of the neighboring micro movable elements 90 below the processing limit.

Further, the micro movable elements 90 of the micro movable element array have movable parts which are driven electrically. Thus, in the micro movable element array it is preferable to ensure the spaced distance between the neighboring micro movable elements 90 which is required to avoid mechanical interference or electric interference.

Due to the processing limit, the preference to avoid the mechanical interference, and the preference to avoid the electrical interference, as described above, according to the related art techniques, there is a case in which it is difficult to implement a sufficiently high population of the micro movable elements 91 in the element arranged direction.

If the sufficiently high population of the micro movable elements 91 in the element arranged direction cannot be implemented, there may be a case where the functionality of the micro movable element array including plural micro movable elements cannot be sufficiently enhanced. For example, a case is assumed where the micro movable elements 90 are micro-mirror elements and the micro movable element array is the micro-mirror element array installed in a wavelength-selective-optical switching device. In this case, the lower the population of the micro movable elements 91 in the element arranged direction becomes, the more the loss of the optical signals, which are received by the micro-mirror element array as a whole and reflected by the mirror surfaces, becomes. For example, a case is assumed where the micro movable elements 90 are angular velocity sensors or acceleration sensors and the micro movable element array is a sensing device. In this case, the lower the population of the micro movable elements 91 in the element arranged direction becomes, the more sensitive to noise the detection signal becomes and thus the sensitivity of the sensor is reduced. It is predicted that the plural neighboring micro movable elements 90 have a noise canceling effect between the neighboring micro movable elements 90 for the noise generated by the micro movable elements 90; however, the lower the population of the micro movable elements 91 in the element arranged direction becomes, the more the noise canceling effect or noise reduction effect is reduced.

SUMMARY

According to an aspect of the embodiment, a micro movable element array is provided. The micro movable element array includes a first frame; a second frame; a first movable part row including plural first movable parts and a second movable part row including plural second movable parts. The first movable parts of the first movable part row include first movable main parts and are supported by the first frame. The second movable parts of the second movable part row include second movable main parts and are supported by the second frame. The first and second frames are stacked such that the first and second movable part rows are opposed to each other. In the first movable part row, the first movable parts are located such that the first movable main parts are arranged in a first direction and the first movable main parts and gaps are disposed alternately. In the second movable part row, the second movable parts are located such that the second movable main parts are arranged in the first direction and the second movable main parts are opposed to the corresponding gaps.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
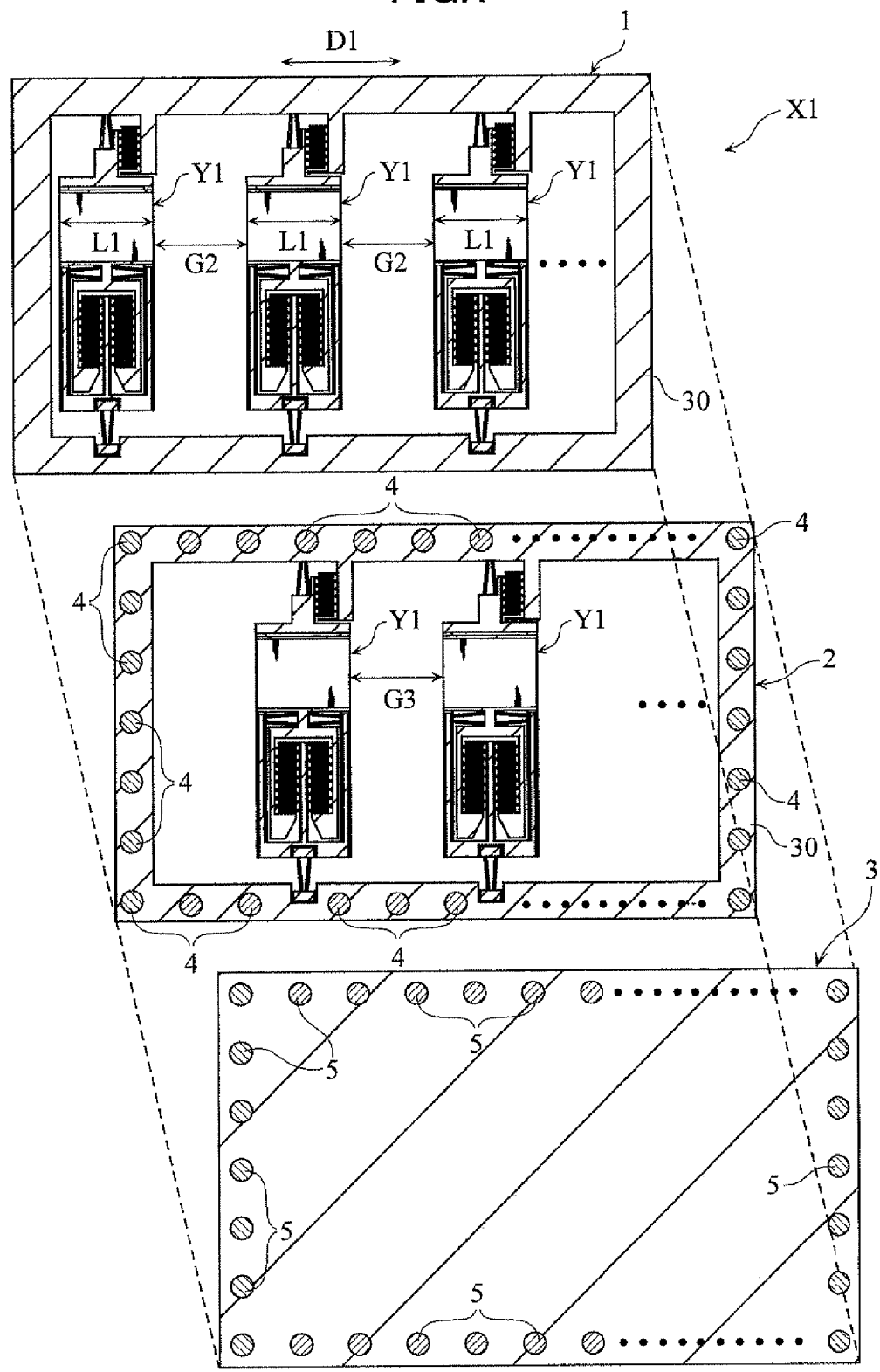
FIG. 1 is an exploded partly omitted plane view of a micro movable element array according to a first embodiment.
Figure 2:
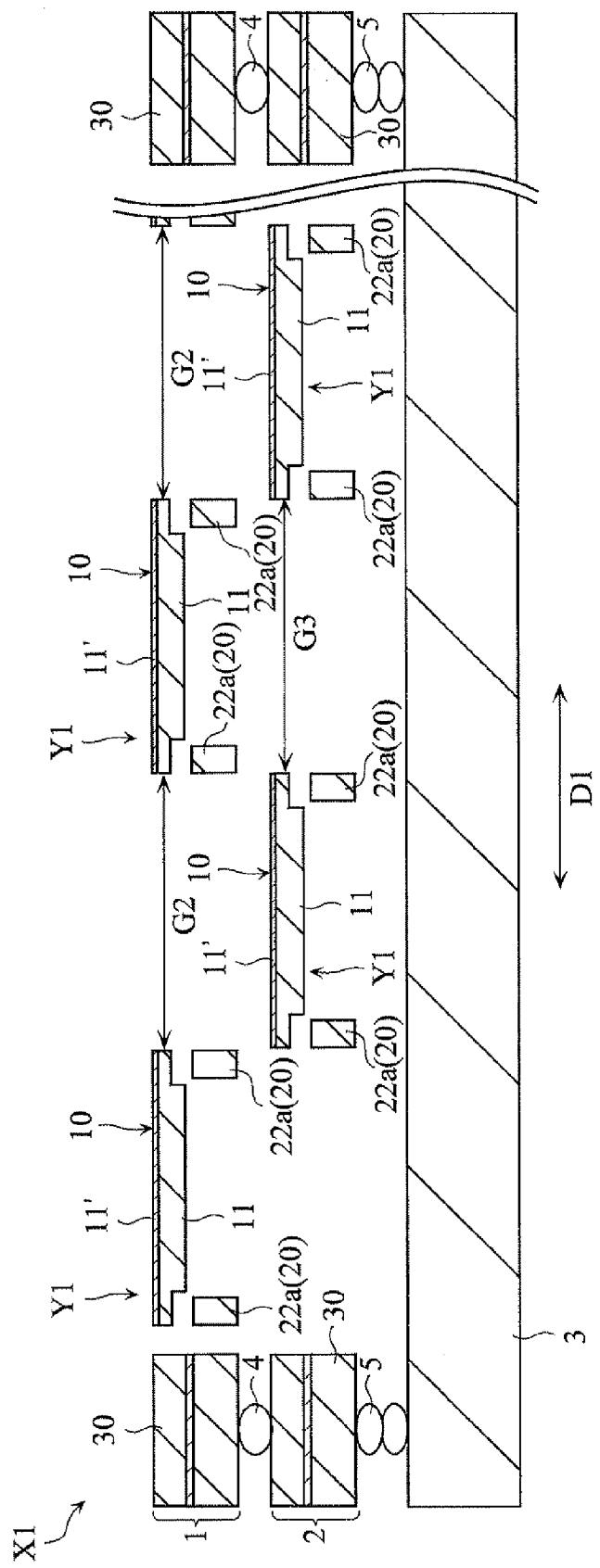
FIG. 2 is a partly omitted cross-sectional view of the micro movable element array according to the first embodiment.

FIGS. 1 and 2 illustrate a micro movable element array X1 according to a first embodiment. FIG. 1 is an exploded partly omitted plane view of the micro movable element array X1. FIG. 2 is a partly omitted cross-sectional view of the micro movable element array X1.

The micro movable element array X1 is a micro-mirror element array in the embodiment and includes a first array 1, a second array 2, a base part 3, plural spacers 4 and plural spacers 5. The plural spacers 4 are provided between the first and second arrays 1 and 2 and the plural spacers 5 are provided between the second array 2 and the base part 3. The base part 3 is a wiring board (wirings are omitted in FIGS. 1 and 2). A part of the first array 1 is electrically coupled to a part of the wirings of the base part 3 via a part of spacers 4, a part of the second array 2 and a part of spacers 5. A part of the second array 2 is electrically coupled to a part of the wirings of the base part 3 via a part of spacers 5. The spacers 4 and 5 for the electrical coupling are made from an electrically conductive material. For example, the spacers 4 and 5 are single or multilayered gold bumps.

Figure 3:
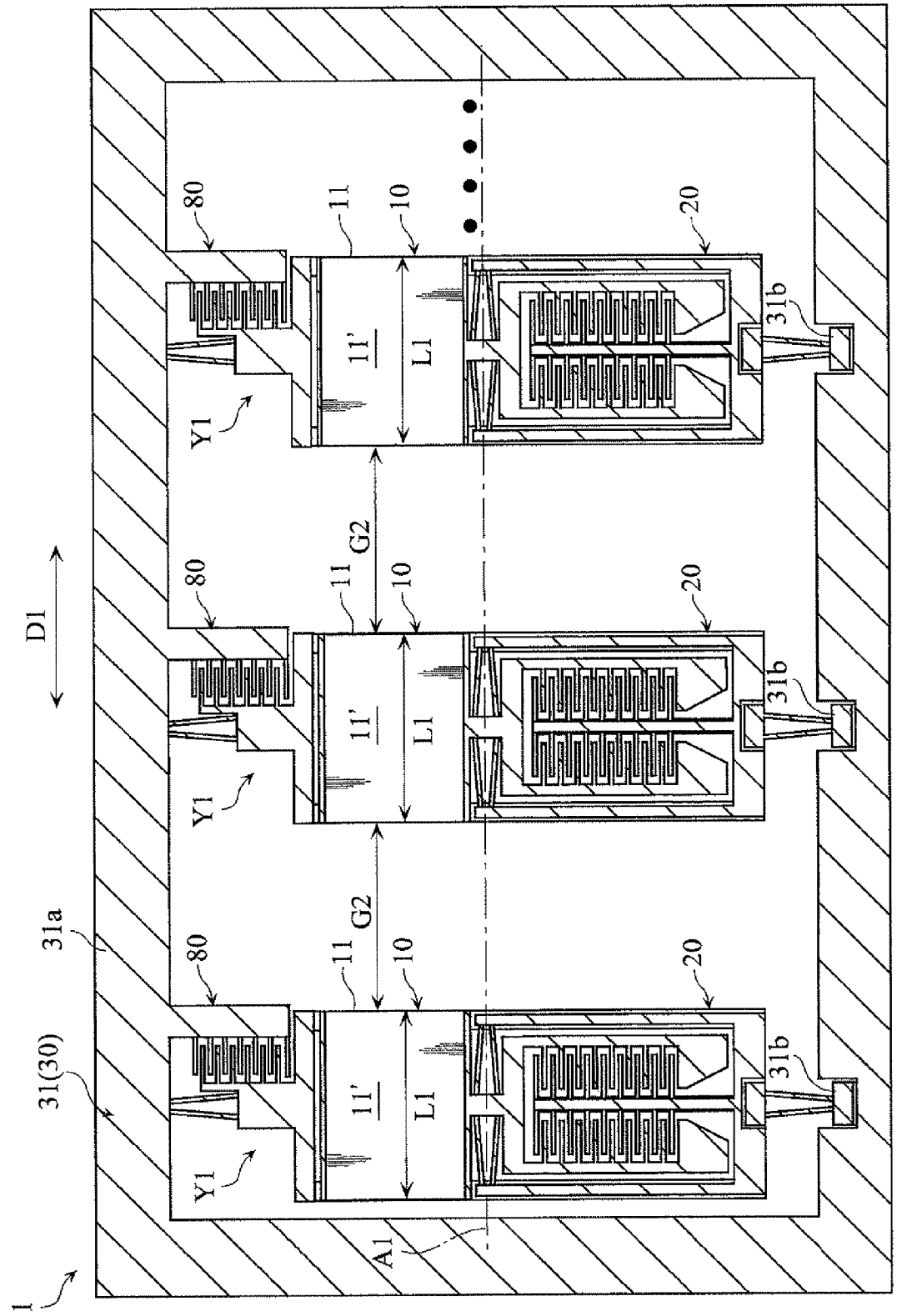
FIG. 3 is a partly omitted plane view of a first array in the first embodiment.
Figure 4:
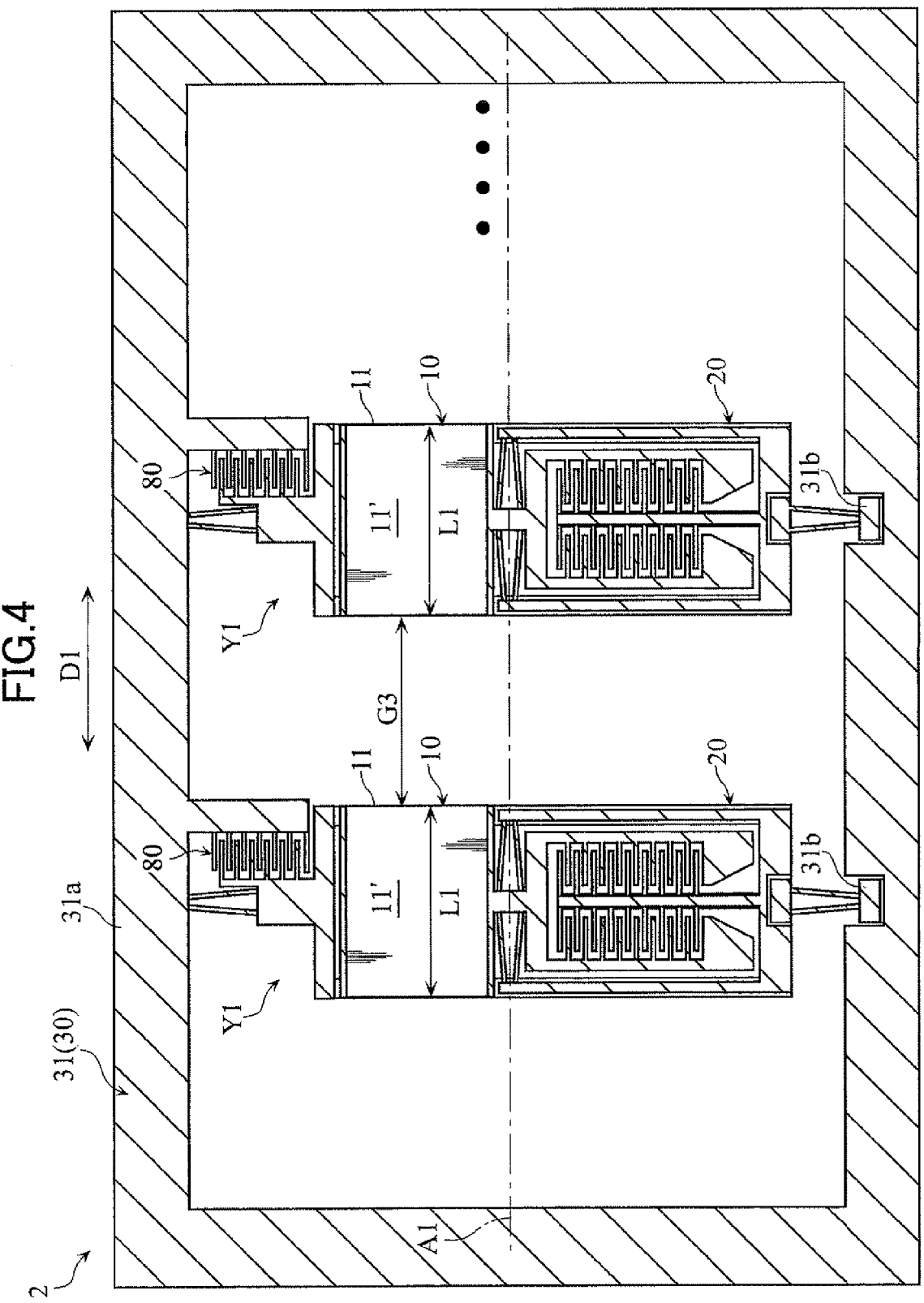
FIG. 4 is a partly omitted plane view of a second array in the first embodiment.

FIG. 3 is a partly omitted plane view of the first array 1. FIG. 4 is a partly omitted plane view of the second array 2. The first and second arrays 1 and 2 include plural micro movable elements Y1, respectively. It is noted that in FIGS. 3 and 4 some of the micro movable elements Y1 are omitted.

Figure 5:
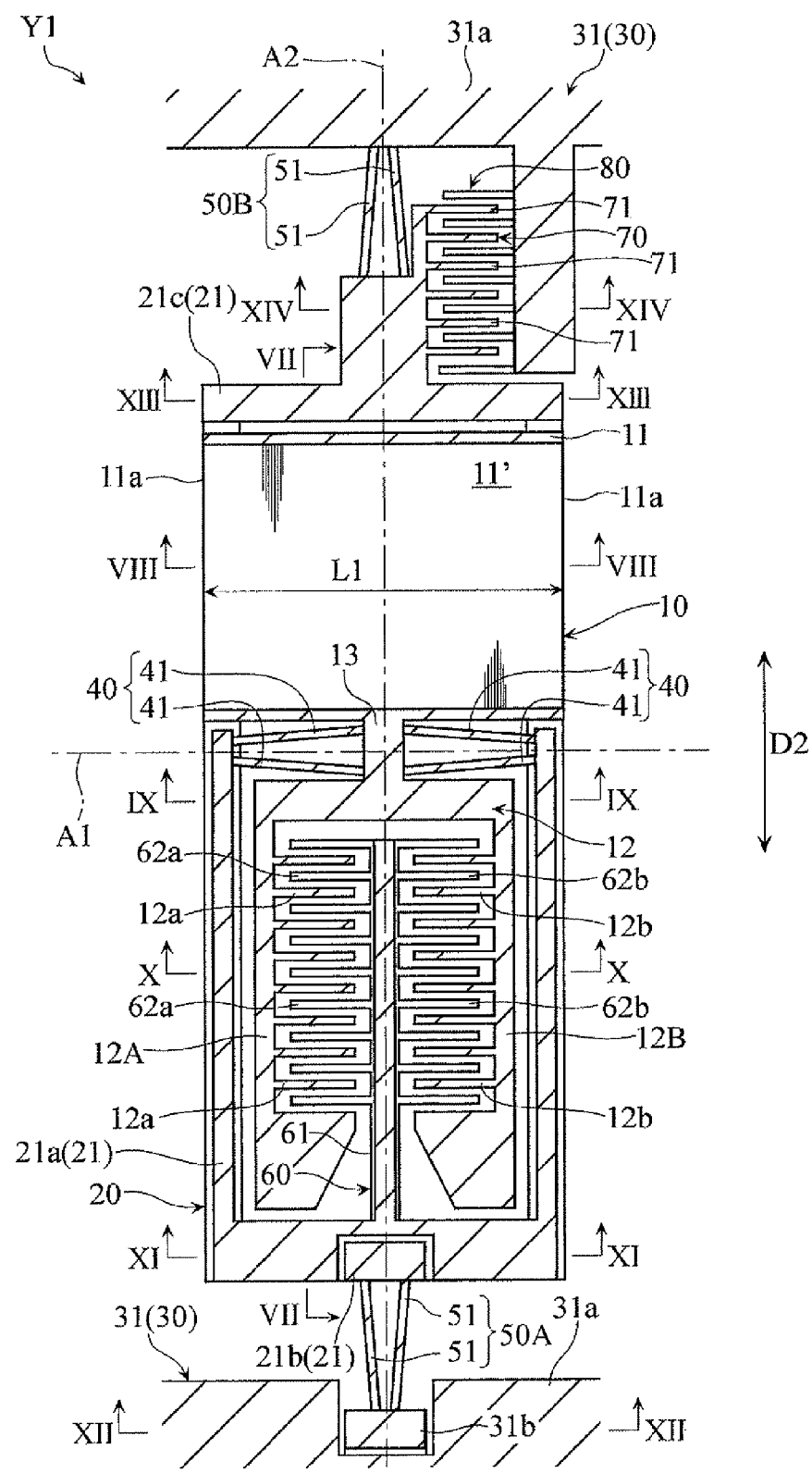
FIG. 5 is a plane view of a micro movable element included in the first array and the second array in the first embodiment.
Figure 6:
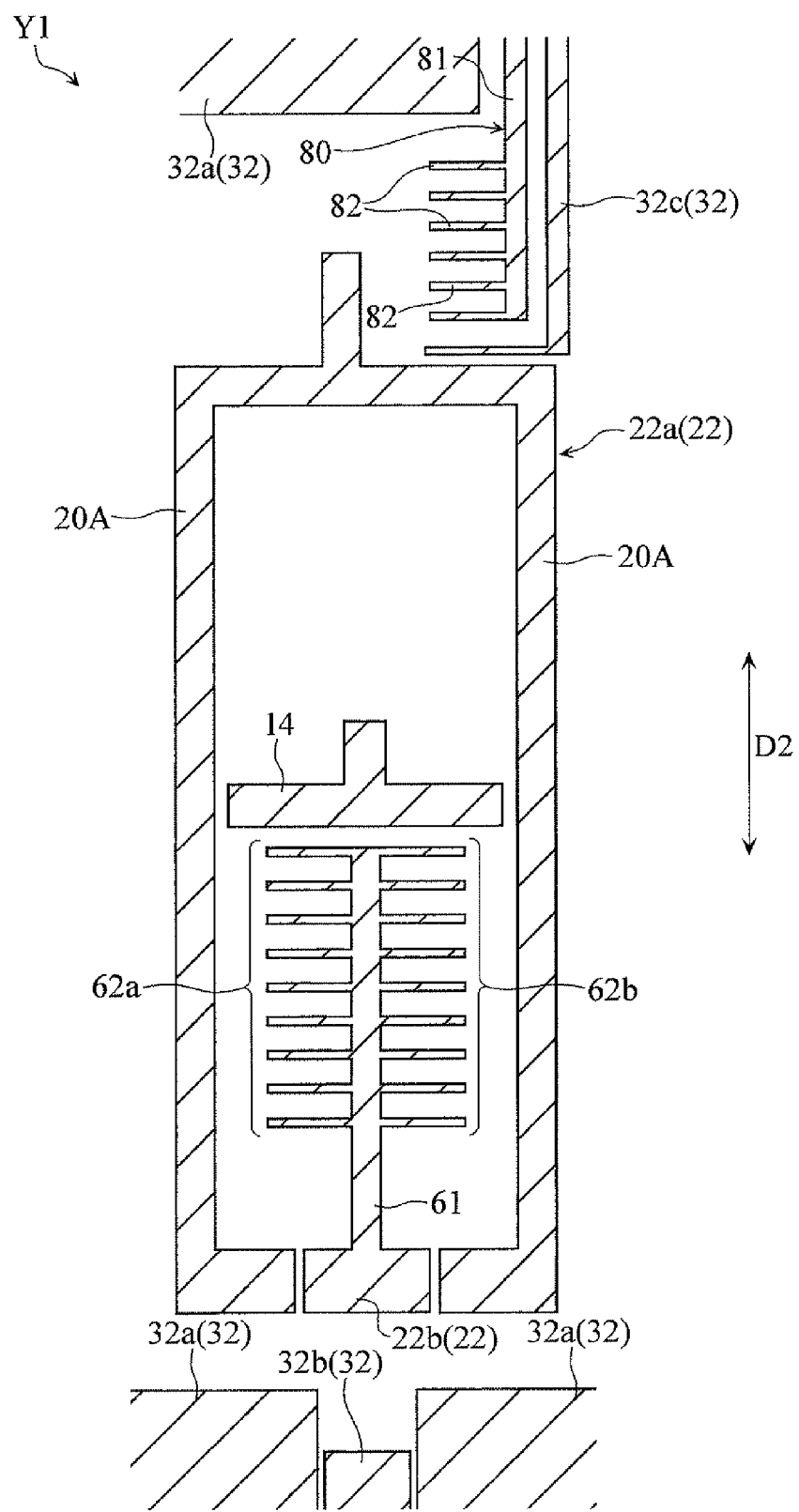
FIG. 6 is a partly omitted plane view of the micro movable element illustrated in FIG. 5.

FIGS. 5-14 illustrate the micro movable elements Y1 included in the first and second arrays 1 and 2. FIG. 5 is a plane view of the micro movable element Y1. FIG. 6 is a partly omitted plane view of the micro movable element Y1. FIGS. 7-14 are enlarged cross-sectional views along lines VII-VII, VIII-VIII, IX-IX, X-X, XI-XI, XII-XII, XIII-XIII and XIV-XIV, respectively.

The micro movable element Y1 is a micro-mirror element in the embodiment and includes an inner movable part 10, a frame 20 as an outer movable part, a frame 30 as a stationary part, a pair of coupling parts 40, a pair of coupling parts 50A and 50B, and electrode parts 60, 70 and 80. Further, the micro movable element Y1 is manufactured by processing a material substrate, which is a so-called SOC (silicon on insulator) wafer using the MEMS technique. The material substrate has a multilayered structure which includes a first silicon layer, a second silicon layer and an insulating layer between the first and second first silicon layers. The silicon layers have impurities doped therein to have a predetermined electrical conductivity. The respective parts of the micro movable element Y1 mainly originate from the first silicon layer and/or the second silicon layer. For the sake of clarity of drawings, in FIGS. 3-5, the parts that originate from the first silicon layer are indicated by oblique line hatchings. Further, the structure illustrated in FIG. 6 is the part of the micro movable element Y1 which originates from the second silicon layer.

The inner movable part 10 includes a land part 11, an electrode part 12, a beam part 13 and a shield part 14.

Figure 8:
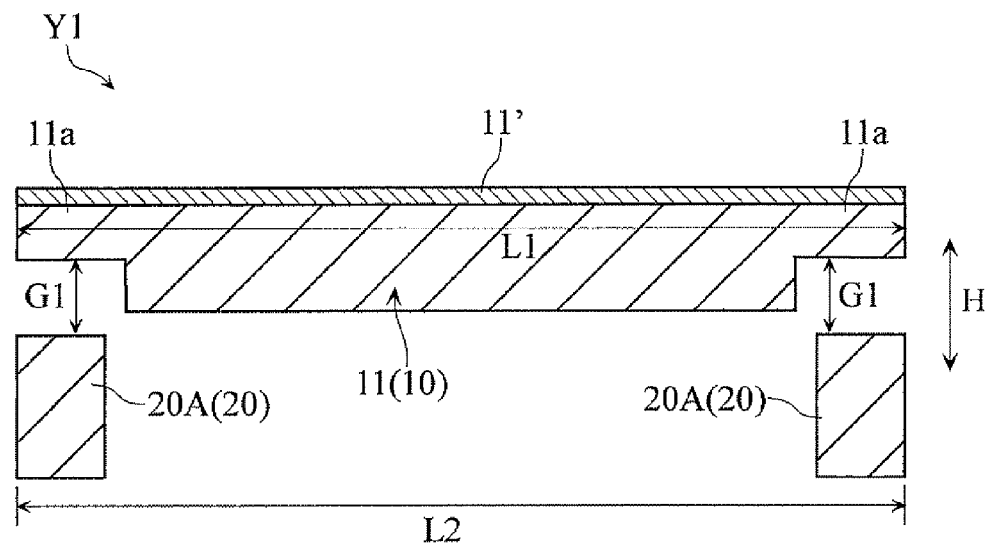
FIG. 8 is an enlarged cross-sectional view along a line VIII-VIII in FIG. 5.

The land part 11 is a portion originating from the first silicon layer. The surface of the land part 11 is provided with a mirror surface 11' which has a light reflecting function. The land part 11 and the mirror surface 11' are a movable main part. The movable main part or land part 11 includes an opposed part 11a which is opposed to the frame 20 and partially made thin in a thickness direction H, as illustrated in FIG. 8. The opposed part 11a extends at the edge of the land part 11 in a direction indicated by an arrow D2 in FIG. 5. Further, the length L1 of the land part 11 illustrated in FIGS. 5 and 8 is 20-300 µm, for example.

Figure 10:
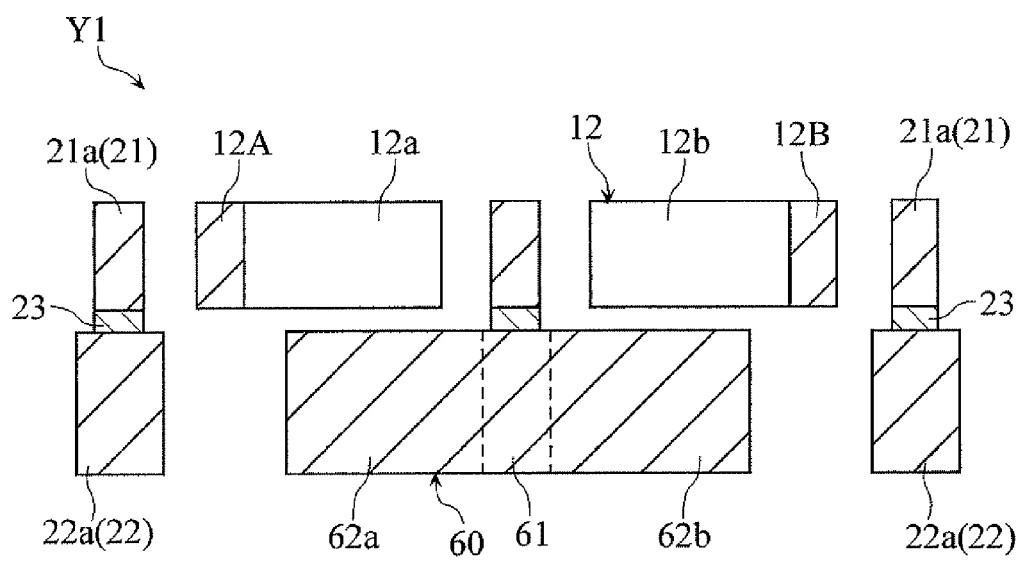
FIG. 10 is an enlarged cross-sectional view along a line X-X in FIG. 5.

The electrode part 12 is a portion originating from the first silicon layer and includes a pair of arms 12A and 12B, plural electrode teeth 12a and plural electrode teeth 12b. The electrode teeth 12a extend from the arm 12A toward the arm 12B side, as illustrated in FIGS. 5 and 10, and are spaced side by side in a direction in which the arm 12A extends, as illustrated in FIG. 5. The electrode teeth 12b extend from the arm 12B toward the arm 12A side and are spaced side by side in a direction in which the arm 12A extends. In this way, the electrode part 12 has a comb-teeth electrode structure. Further, the electrode part 12 is a portion to which a predetermined reference potential (for example, ground potential) is applied at the time of driving the micro movable element Y1.

The beam part 13 is a portion originating from the first silicon layer. The beam part 13 couples the land part 11 and the electrode part 12.

Figure 9:
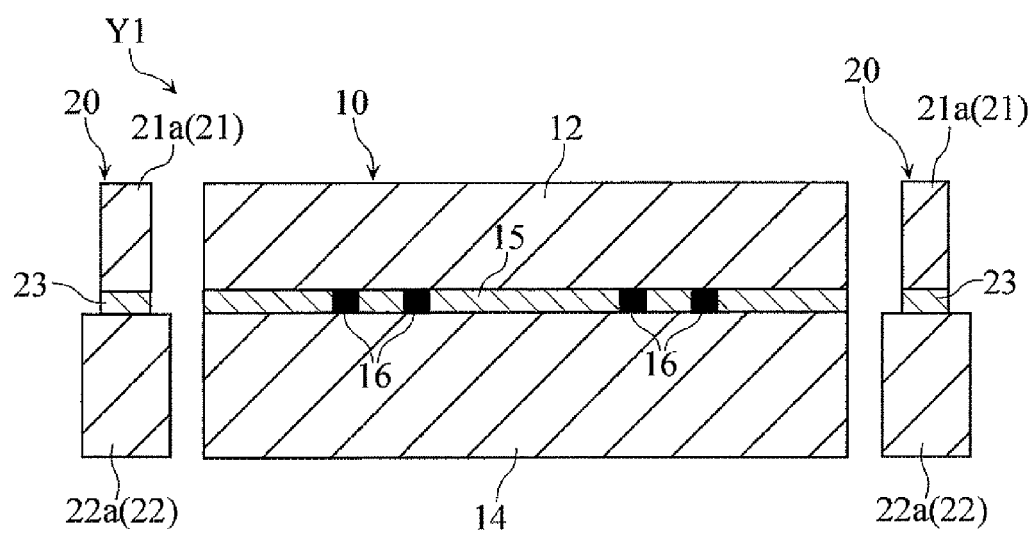
FIG. 9 is an enlarged cross-sectional view along a line IX-IX in FIG. 5.

The shield part 14 is a portion originating from the second silicon layer, as illustrated in FIG. 6. The shield part 14 is coupled to the electrode part 12 via the insulating layer 15, as illustrated in FIG. 9. The shield part 14 and the electrode part 12 are electrically coupled via electrically conductive vias 16 penetrating the insulating layer 15.

Figure 7:
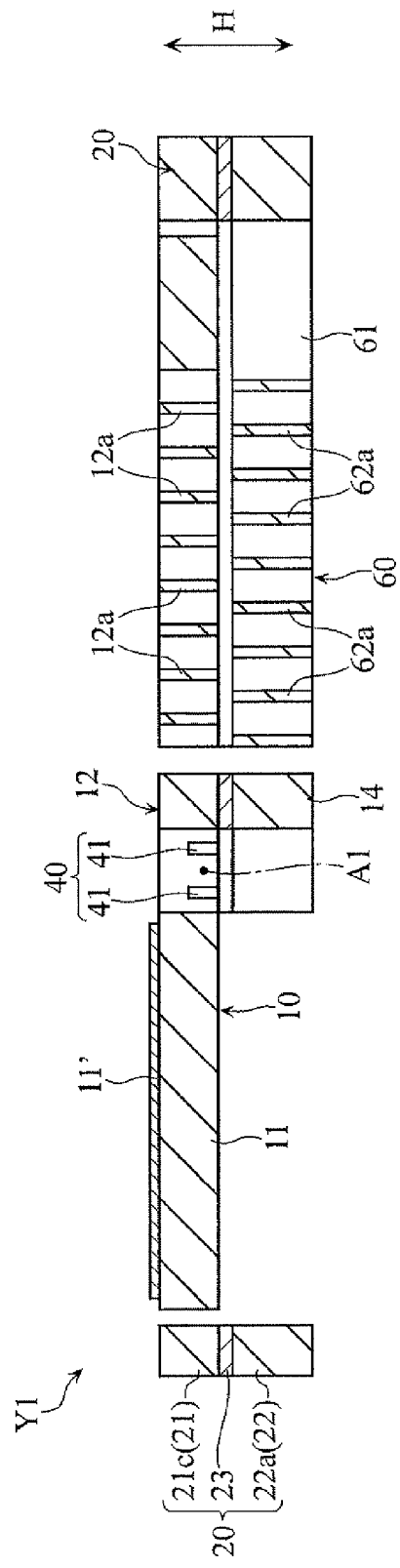
FIG. 7 is an enlarged cross-sectional view along a line VII-VII in FIG. 5.
Figure 11:
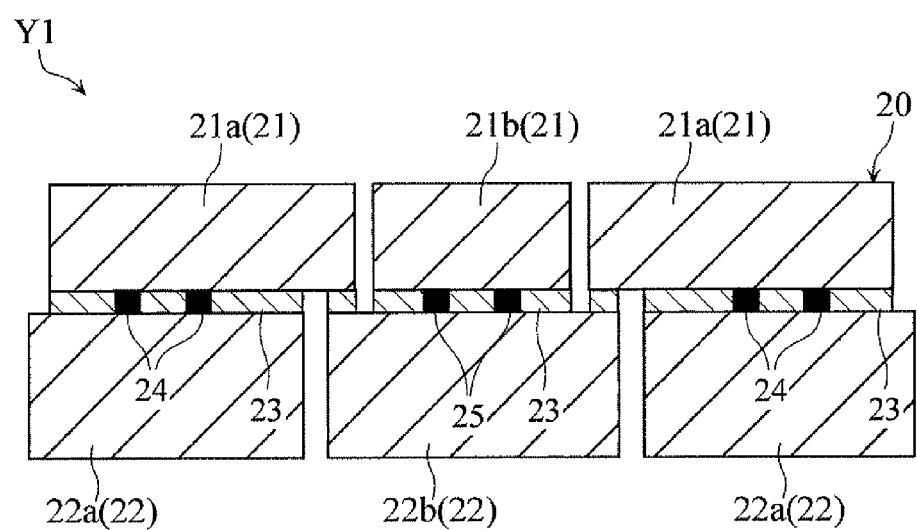
FIG. 11 is an enlarged cross-sectional view along a line XI-XI in FIG. 5.
Figure 13:
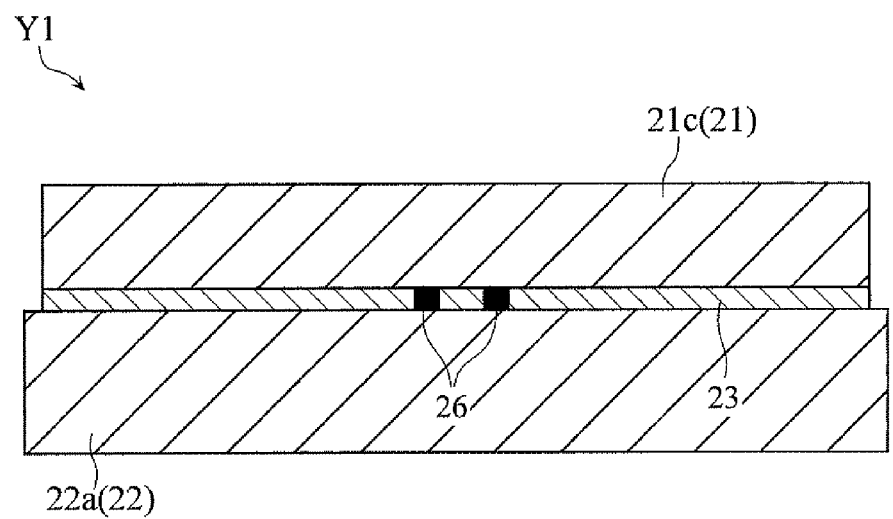
FIG. 13 is an enlarged cross-sectional view along a line XIII-XIII in FIG. 5.

The frame 20 has a multilayered structure which includes a first layer part 21 originating from the first silicon layer, a second layer part 22 originating from the second silicon layer, and an insulating layer 23 between the first and second layer parts 21 and 22, as illustrated in FIGS. 7 and 11, for example. The first layer part 21 includes parts 21a, 21b and 21c which are apart from each other, as illustrated in FIG. 5. The second layer part 22 includes parts 22a and 22b which are apart from each other, as illustrated in FIG. 6. The part 21a of the first layer part 21 has such a shape that it partially surrounds the inner movable part 10, as illustrated in FIG. 5. The part 22a of the second layer part 22 has such a shape that it partially surrounds the inner movable part 10. The parts 21a and 22a are electrically coupled via electrically conductive vias 24 penetrating the insulating layer 23, as illustrated in FIG. 11. The parts 21b and 22b are electrically coupled via electrically conductive vias 25 penetrating the insulating layer 23. The parts 21c and 22a are electrically coupled via electrically conductive vias 26 penetrating the insulating layer 23, as illustrated in FIG. 13.

Further, a frame 20 includes a pair of extended parts 20A which extend along the land part 11 of the inner movable part 10 or the movable main part in a direction indicated by an arrow D2 in FIGS. 5 and 6.

The pair of extended parts 20A is opposed to the land part 11 or the opposed part 11a of the movable main part via a clearance in the thickness direction H, as illustrated in FIG. 8. A gap G1 between the land part 11 and the extended part 20A in the thickness direction H is greater than the thinness of the insulating layer of the material substrate and is within a range from 0.5 µm to 20 µm, for example. Further, the length L2 between the outer ends of the extended parts 20A as illustrated in FIG. 8 is less than or equal to the length L1 of the land part 11 or the movable main part.

Figure 12:
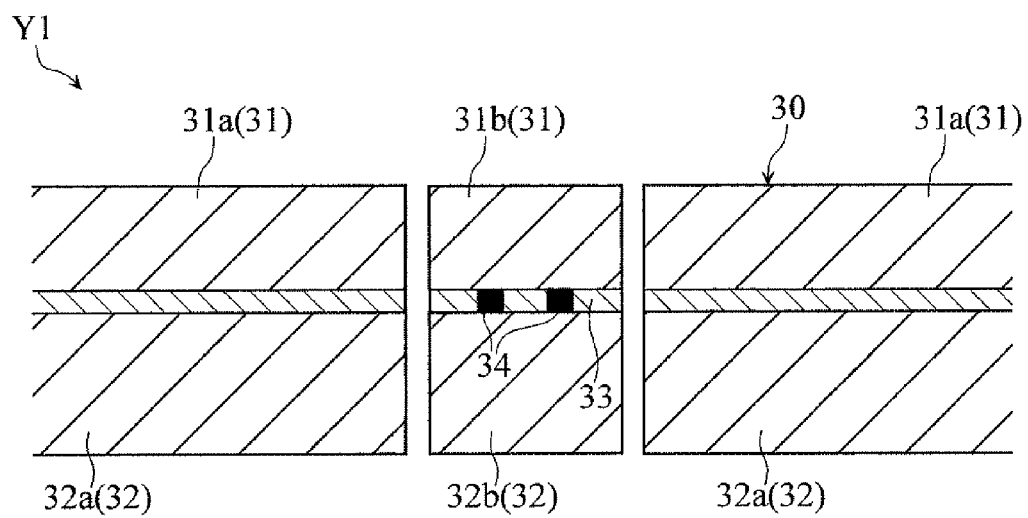
FIG. 12 is an enlarged cross-sectional view along a line XII-XII in FIG. 5.
Figure 14:
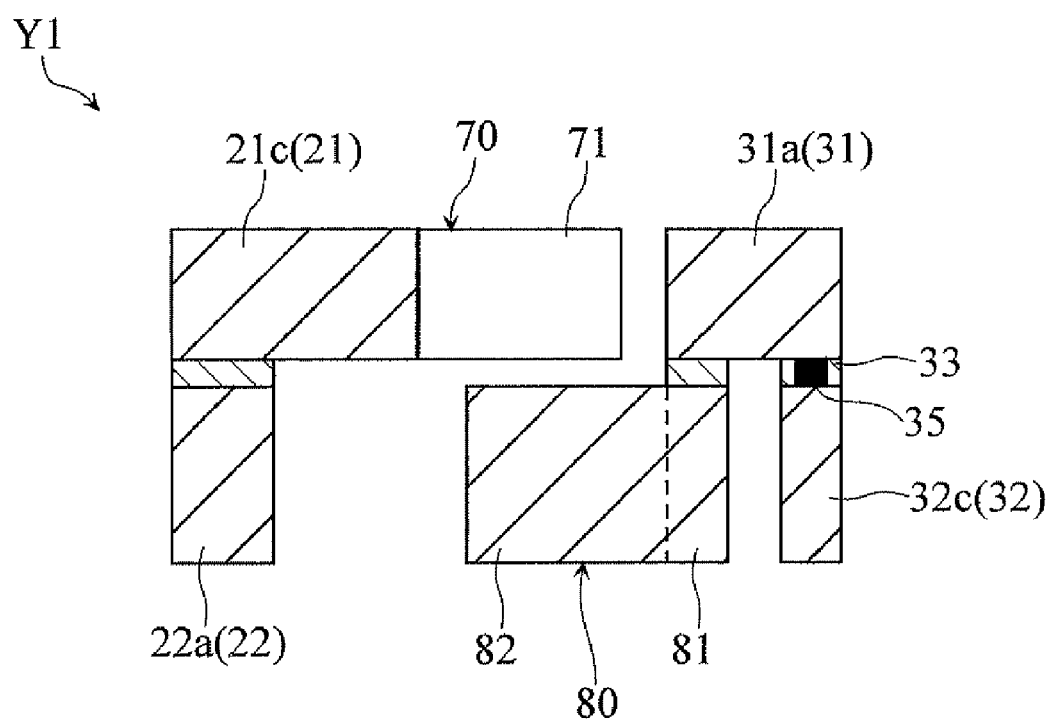
FIG. 14 is an enlarged cross-sectional view along a line XIV-XIV in FIG. 5.

The frame 30 has a multilayered structure which includes a first layer part 31 originating from the first silicon layer, a second layer part 32 originating from the second silicon layer, and an insulating layer 33 between the first and second layer parts 31 and 32, as illustrated in FIG. 12. The first layer part 31 includes parts 31a and 31b which are apart from each other, as illustrated in FIGS. 5 and 12. The part 31a includes parts which are apart from each other (not illustrated). The second layer part 32 includes parts 32a, 32b and 32c which are apart from each other, as illustrated in FIGS. 6 and 12. The part 32a includes parts which are apart from each other (not illustrated). The parts 31b and 32b are electrically coupled via electrically conductive vias 34 penetrating the insulating layer 33, as illustrated in FIG. 12. A part of the part 31a and the part 32c are electrically coupled via an electrically conductive via 35 penetrating the insulating layer 33, as illustrated in FIG. 14.

The paired coupling parts 40 include two torsion bars 41, respectively, as illustrated in FIG. 5. The coupling parts 40 are portions originating from the first silicon layer. The coupling parts 40 couple to the beam portion 13 of the inner movable part 10 and the part 21a of the first layer part 21 of the frame 20 to couple the inner movable part 10 and the frame 20. The beam part 13 and the part 21a are electrically coupled via the coupling parts 40. The spacing between two torsion bars 41 which form the respective coupling parts 40 gradually increases, when viewed from the frame 20 side to the inner movable part 10 side. Further, the torsion bars 41 are thinner than the inner movable part 10 and the first layer part 21 of the frame 20 in the thickness direction H, as illustrated in FIG. 7. The pair of the coupling parts 40 defines the axis A1 of the rotation of the inner movable part 10 or the movable main part (the land part 11 and the mirror surface 11'). The extending direction of the electrode teeth 12a and 12b are parallel with the extending direction of the axis A1. The coupling parts 40, each of which includes two torsion bars 41 such that the spacing between the torsion bars 41 gradually increases when viewed from the frame 20 side to the inner movable part 10 side, are suited for preventing an unnecessary displacement component from generating when the inner movable part 10 operates.

The paired coupling parts 50A, 50B include two torsion bars 51, respectively, as illustrated in FIG. 5. The coupling parts 50A, 50B are portions originating from the first silicon layer and couple the frame 20 and the frame 30. Specifically, as illustrated in FIG. 5, the coupling part 50A couples the part 21b of the first layer part 21 of the frame 20 and the part 31b of the first layer part 31 of the frame 30 to couple the frame 20 and the frame 30. The parts 21b and 31b are electrically coupled via the coupling part 50A. The coupling part 50B couples the part 21c of the first layer part 21 of the frame 20 and a part of the part 31a of the first layer part 31 of the frame 30 to couple the frame 20 and the frame 30. The part 21c and the part of the part 31a are electrically coupled via the coupling part 50B. The spacing between two torsion bars 51 which form the respective coupling parts 50A and 50B gradually increases, when viewed from the frame 30 side to the frame 20 side. Further, as is the case with the torsion bars 41, the torsion bars 51 are thinner than the first layer part 21 of the frame 20 and the first layer part 31 of the frame 30 in the thickness direction H. The pair of the coupling parts 50A and 50B defines an axis A2 of rotation of the frame 20 and thus the inner movable part 10. In the embodiment, the axis A2 and the axis A1 interconnect perpendicularly. The coupling parts 50A and 50B, each of which includes two torsion bars 51 such that the spacing between the torsion bars 51 gradually increases when viewed from the frame 30 side to the frame 30 side, is suited for preventing an unnecessary displacement component from generating when the frame 20 and thus the inner movable part 10 operates.

The electrode part 60 is a portion originating from the second silicon layer and includes an arm 61, plural electrode teeth 62a and plural electrode teeth 62b, as well-illustrated in FIG. 6. The arm 61 extends from the part 22b of the second layer part 22 of the frame 20. The electrode teeth 62a extend from the arm 61 toward the arm 12A side of the electrode part 12, and are spaced side by side in a direction in which the arm 61 extends. The electrode teeth 62b extend from the arm 61 toward the arm 12B side of the electrode part 12, and are spaced side by side in the direction in which the arm 61 extends. In this way, the electrode part 60 has a comb-teeth electrode structure.

The electrode part 70 is a portion originating from the first silicon layer and includes plural electrode teeth 71, as illustrated in FIG. 5. The electrode teeth 71 extend from the part 21c of the first layer part 21 of the frame 20 toward the electrode part 80 side, as illustrated in FIGS. 5 and 14, and are spaced side by side in the extending direction of the axis A2. In this way, the electrode part 70 has a comb-teeth electrode structure.

The electrode part 80 is a portion originating from the second silicon layer and includes an arm 81 and plural electrode teeth 82, as illustrated in FIG. 6. The arm 81 extends in the extending direction of the axis A2. The electrode teeth 82 extend from the arm 81 toward the electrode part 70 side and are spaced apart side by side in a direction in which the arm 81 extends. In this way, the electrode part 80 has a comb-teeth electrode structure.

In the micro movable element Y1, the pair of the electrode part 12 and 60 may form a driving mechanism or an actuator for generating the driving force associated with the rotation of the inner movable part 10 around the axis A1. Further, the pair of the electrode part 70 and 80 may form a driving mechanism or an actuator for generating the driving force associated with the rotation of the frame 20 and thus the inner movable part 10 around the axis A2.

At the time of driving the micro movable element Y1, the reference potential is applied to the electrode part 12 of the inner movable part 10 and the electrode part 70. The reference potential may be applied to the electrode part 12 via a part of the part 31a of the first layer part 31 of the frame 30, the coupling part 50B (the torsion bars 51), the part 21c of the first layer part 21 of the frame 20, the electrically conductive vias 26 (illustrated in FIG. 13), the part 22a of the second layer part 22 of the frame 20, the electrically conductive vias 24 (illustrated in FIG. 11), the part 21a of the first layer part 21 of the frame 20, the coupling parts 40 (the torsion bars 41), and the beam part 13 of the inner movable part 10. The reference potential may be applied to the electrode part 70 via a part of the part 31a of the first layer part 31 of the frame 30, the coupling part 50B (the torsion bars 51), and the part 21c of the first layer part 21 of the frame 20. A portion (a reference potential applied part) of the part 31a of the first layer part 31 of the frame 30 to which the reference potential is applied is spaced apart from other portions of the part 31a to be electrically isolated therefrom. The reference potential is a ground potential, for example. Preferably, the reference potential is kept constant.

Figure 15:
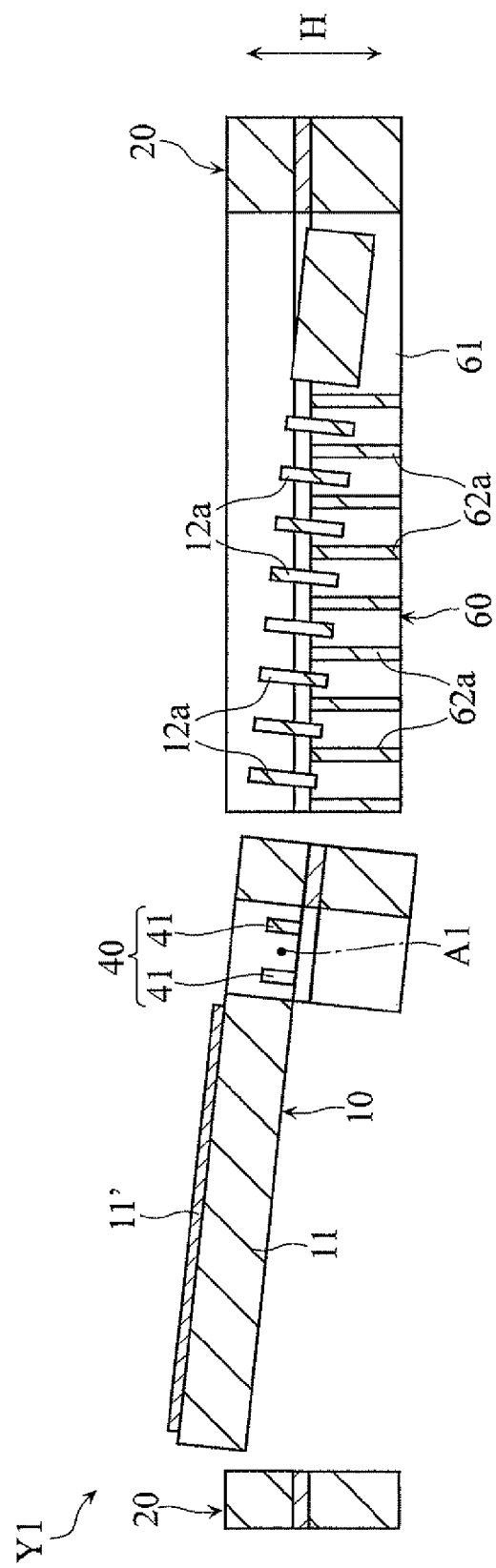
FIG. 15 is an enlarged cross-sectional view along a line VII-VII in FIG. 5 at the time of operation.

The driving potential higher than the reference potential is applied to the electrode parts 60 and 80, respectively, as necessary. The application of the driving potential to the electrode part 60 generates electrostatic attraction between the electrode parts 12 and 60 and thus enables the inner movable part 10 to rotate around the axis A1, as illustrated in FIG. 15. The application of the driving potential to the electrode part 80 generates electrostatic attraction between the electrode parts 70 and 80 and thus enables the frame 20 and thus the inner movable part 10 to rotate around the axis A2. The micro movable element Y1 is a so-called oscillating element in two axes. The driving potential may be applied to the electrode part 60 via the part 32b of the second layer part 32 of the frame 30, the electrically conductive vias 34 (illustrated in FIG. 12), the part 31b of the first layer part 31 of the frame 30, the coupling part 50A (the torsion bars 51), the part 21b of the first layer part 21 of the frame 20, the electrically conductive vias 25 (illustrated in FIG. 11), and the part 22b of the second layer part 22 of the frame 20. Such driving in the two axes can switch the reflecting direction of the light reflected by the mirror surface 11' on the land part 11 of the micro movable element Y1, as appropriate.

The first array 1 includes plural micro movable elements Y1, as illustrated in FIGS. 1-3. In the first array 1, the micro movable elements Y1 are aligned in a row in the extending direction of the axis A1 such that all the axes A2 (not illustrated in FIGS. 1-3) are parallel with each other. In the first array 1, the frame 30 of the respective micro movable elements Y1 is an integrated frame body which surrounds the first movable parts (i.e., the inner movable parts 10, the frames 20, the coupling parts 40 and the electrode parts 60) of all the micro movable elements Y1. The first movable parts of all the micro movable elements Y1 in the first array 1 form a first movable part row. In the first movable part row, the first movable parts are aligned in a row such that the land parts 11 including the mirror surfaces 11' (i.e. the movable main parts) and gaps G2 are located alternately and the movable main parts are aligned in a row in an arrangement direction D1 of the first movable parts. In the embodiment, in the first movable part row, the length L1 of the land part 11 or the mirror surface 11' in the arrangement direction D1 is set to be the same as the gap G2. Thus, in the embodiment, the population of the land parts 11 or the mirror surfaces 11' in the arrangement direction D1 within the frame 30 of the first array 1 is about 50 percent. The population in the first array 1 may be set to different values. Further, in the first array 1, the reference potential applied part of the part 31a of the first layer part 31 of the frame 30 is continuous over all the micro movable elements Y1. The electrode parts 12 and the shield parts 14 of the inner movable parts 10, the parts 21a and 21c of the first layer parts 21 and the parts 22a of the second layer parts 22 of the frames 20, the parts 32c of the second layer part 32 of the frame 30 and the electrode parts 70 of all the micro movable elements Y1 of the first array 1 are electrically coupled.

The second array 2 includes plural micro movable elements Y1, as illustrated in FIGS. 1, 2 and 4. In the second array 2, the micro movable elements Y1 are aligned in a row in the extending direction of the axis A1 such that all the axes A2 (not illustrated in FIG. 4) are parallel with each other. In the second array 2, the frame 30 of the respective micro movable elements Y1 is an integrated frame body which surrounds the second movable parts (i.e., the inner movable parts 10, the frames 20, the coupling parts 40 and the electrode parts 60) of all the micro movable elements Y1. The second movable parts of all the micro movable elements Y1 in the second array 2 form a second movable part row. In the second movable part row, the second movable parts are aligned in a row such that the respective land parts 11 including the mirror surfaces 11' (i.e. the movable main parts) are opposed to the corresponding one of the gaps G2 of the first movable part row and the movable main parts are aligned via the gaps G3 in a row in an arrangement direction D1. Further, in the second movable part row, the movable main parts and the gaps G3 are located alternately. If in the second movable part row the length L1 of the land part 11 or the mirror surface 11' in the arrangement direction D1 is set to be the same as the gap G3, the population of the land parts 11 or the mirror surfaces 11' in the arrangement direction D1 within the frame 30 of the second array 2 is about 50 percent. The population in the second array 2 may be set to different values. The length L1 of the land part 11 (or the mirror surface 11') of the second array 2 may be set such that opposite ends of the respective land parts 11 (or the mirror surface 11') of the second array 2 in the arrangement direction D1 overlap the land parts 11 (or the mirror surface 11') of the first array 1. In this case, in the second array 2, G3 is smaller than L1 and the population of the land parts 11 or the mirror surfaces 11' in the arrangement direction D1 within the frame 30 of the second array 2 is greater than 50 percent. Further, in the second array 2, the reference potential applied part of the part 31a of the first layer part 31 of the frame 30 is continuous over all the micro movable elements Y1. The electrode parts 12 and the shield parts 14 of the inner movable parts 10, the parts 21a and 21c of the first layer parts 21 and the parts 22a of the second layer parts 22 of the frames 20, the parts 32c of the second layer part 32 of the frame 30 and the electrode parts 70 of all the micro movable elements Y1 of the second array 2 are electrically coupled.

The base part 3 includes a reference potential wiring and plural pairs of driving wirings (first driving wirings and second driving wirings). The reference potential wiring is electrically coupled to the reference potential applied parts of the parts 31a of the first layer parts 31 of the respective frames 30 of the first and second arrays 1 and 2. The first driving wirings are electrically coupled to the electrode parts 60 of the micro movable elements Y1 of the first and second arrays 1 and 2. The second driving wiring is electrically coupled to the electrode parts 80 of the micro movable elements Y1 of the first and second arrays 1 and 2. A concrete example is as follows.

In the first array 1, the reference potential applied parts of the parts 31a of the first layer part 31 of the frame 30 are electrically coupled to a part (reference potential applied parts) of the parts 32a of the second layer part 32 of the frame 30 via predetermined electrically conductive vias (not illustrated) penetrating the insulating layer 33 of the frame 30. The reference potential applied parts of the parts 32a are coupled to at least one of the spacers 4 of the electrically conductive material which in turn is coupled to the reference potential applied parts of the parts 31a of the first layer part 31 of the frame 30 of the second array 2. Thus, the reference potential applied parts of the parts 31a of the first layer part 31 of the frame 30 of the first array 1 are electrically coupled to the reference potential applied parts of the parts 31a of the first layer part 31 of the frame 30 of the second array 2. Further, in the second array 2, the reference potential applied parts of the parts 31a of the first layer part 31 of the frame 30 are electrically coupled to a part (reference potential applied parts) of the parts 32a of the second layer part 32 of the frame 30 via predetermined electrically conductive vias (not illustrated) penetrating the insulating layer 33 of the frame 30. The reference potential applied parts of the parts 32a are coupled to at least one of the spacers 5 of the electrically conductive material which in turn is coupled to a part (i.e., the reference potential wiring) of the wirings of the base part 3. Thus, the reference potential applied parts of the parts 31a of the first layer parts 31 of the respective frames 30 of the first and second arrays 1 and 2 are electrically coupled to the reference potential wiring of the base part 3.

The parts 32 of the second layer part 32 of the frame 30 of the micro movable elements Y1 of the first array 1 (which are electrically coupled to the electrode parts 60 of the corresponding micro movable elements Y1) are coupled to the spacers 4 which are made from the electrically conductive material. The spacers 4 are coupled to a part (first driving potential applied parts) of the parts 31a of the first layer part 31 of the frame 30 of the second array 2. In the second array 2, the first driving potential applied parts of the parts 31a of the first layer part 31 of the frame 30 are electrically coupled to a part (first driving potential applied parts) of the parts 32a of the second layer part 32 of the frame 30 via predetermined electrically conductive vias (not illustrated) penetrating the insulating layer 33 of the frame 30. The first driving potential applied parts of the parts 32a are coupled to the spacers 5 of the electrically conductive material which in turn are coupled to one of the first driving wirings of the base part 3. Thus, the parts 32b and thus the electrode parts 60 of the micro movable elements Y1 of the first array 1 are electrically coupled to one of the first driving wirings of the base part 3.

The electrode parts 80 of the micro movable elements Y1 of the first array 1 are coupled to the spacers 4 which are made from the electrically conductive material. The spacers 4 are coupled to a part (second driving potential applied parts) of the parts 31a of the first layer part 31 of the frame 30 of the second array 2. In the second array 2, the second driving potential applied parts of the parts 31a of the first layer part 31 of the frame 30 are electrically coupled to a part (second driving potential applied parts) of the parts 32a of the second layer part 32 of the frame 30 via predetermined electrically conductive vias (not illustrated) penetrating the insulating layer 33 of the frame 30. The second driving potential applied parts of the parts 32a are coupled to the spacers 5 of the electrically conductive material which in turn are coupled to one of the second driving wirings of the base part 3. Thus, the electrode parts 80 of the micro movable elements Y1 of the first array 1 are electrically coupled to one of the second driving wirings of the base part 3.

The parts 32 of the second layer part 32 of the frame 30 of the micro movable elements Y1 of the second array 2 (which are electrically coupled to the electrode parts 60 of the corresponding micro movable elements Y1) are coupled to the spacers 5 which are made from the electrically conductive material. The spacers 5 are coupled to one of the first driving wirings of the base part 3. Thus, the parts 32b and thus the electrode parts 60 of the micro movable elements Y1 of the second array 2 are electrically coupled to one of the first driving wirings of the base part 3.

The electrode parts 80 of the micro movable elements Y1 of the second array 2 are coupled to the spacers 5 which are made from the electrically conductive material. The spacers 5 are coupled to one of the second driving wirings of the base part 3. Thus, the electrode parts 80 of the micro movable elements Y1 of the second array 2 are electrically coupled to one of the second driving wirings of the base part 3.

Specifically, the electrical coupling relationships described above are formed between the reference potential applied parts (including the electrode parts 12 and 70) and the electrode parts 60 and 80 of the micro movable elements Y1 of the micro movable element array X1 and the reference potential wiring and the pairs of the driving wirings.

At the time of driving the micro movable element array X1, the driving potential is applied to the respective electrode parts 60 and 80 of the selected micro movable element Y1 while the reference potential is commonly applied to the electrode parts 12 of the inner movable parts 10 and the electrode parts 70 of all the micro movable elements Y1. In this way, the inner movable parts 10 and the frames 20 of the respective micro movable elements Y1 are separately driven to oscillate, which enables switching the reflecting directions of the light reflected by the mirror surfaces 11' on the land parts 11 of the inner movable parts 10 of the micro movable elements Y1, as appropriate.

According to the micro movable element array X1 having the configuration described above, the first array 1 or the frame 30 thereof and the second array 2 or the frame 30 thereof are multilayered via the spacers 4. As illustrated in FIG. 3, the first movable parts (including the inner movable parts 10 and the frames 20) of the micro movable elements Y1 are supported by the frame 30 of the first array 1 such that the first movable parts form the first movable part row as described above. In the first movable part row, as described above, the first movable parts are aligned in a row such that the land parts 11 including the mirror surfaces 11' (i.e. the movable main parts) and gaps G2 are located alternately and the movable main parts are aligned in a row in an arrangement direction D1.

On the other hand, as illustrated in FIG. 4, the second movable parts (including the inner movable parts 10 and the frames 20) of the micro movable elements Y1 are supported by the frame 30 of the second array 2 such that the second movable parts form the second movable part row as described above. In the second movable part row, as described above, the second movable parts are aligned in a row such that the respective land parts 11 including the mirror surfaces 11' (i.e. the movable main parts) are opposed to the corresponding one of the gaps G2 of the first movable part row and the movable main parts are aligned via the gaps G3 in a row in an arrangement direction D1.

In the micro movable element array X1, one of two neighboring movable parts in the arrangement direction D1 is located on the first array 1 and another is located on the second array 2, wherein the neighboring movable parts are shifted (offset) in the multilayered direction of the first and second array 1 and 2, as illustrated in FIG. 2. Further, two neighboring movable main parts (the first and second movable main parts) in the arrangement direction D1 are also shifted in the multilayered direction of the first and second array 1 and 2. According to the micro movable element array X1, it is possible to arrange the movable main parts (the first and second movable main parts) of the two neighboring movable parts in the arrangement direction D1 such that they are close to each other in spite of the processing limit while preventing the mechanical and electrical interference between two neighboring movable parts. Therefore, the micro movable element array X1 can implement high population of the movable main parts (the land parts 11 including the mirror surfaces 11', in the embodiment) in the arrangement direction D1 of the elements or movable parts. The higher the population of the land parts 11 or the mirror surfaces 11' in the arrangement direction D1, the more the loss can be reduced with respect to the optical signals received by the micro movable element array X1 as a whole and reflected by the mirror surfaces 11'. In the micro movable element array X1, it is possible to implement greater than or equal to 99 percent, that is to say, substantially 100 percent of the population of the land parts 11 or the mirror surfaces 11' in the arrangement direction D1. It is assumed that the micro movable element array X1 is used as a wavelength selective switch in a wavelength division multiplexing (WDM) communication system. In this case, in the micro movable element array X1, it is possible to set a great wavelength band or frequency band by setting the wavelength band or the frequency band without interruption with respect to the optical signals as reflecting target signals allocated for the respective mirror surfaces 11'.

In general, the light reflected by the edge of the light reflecting surface may be scattered. In the optical switching device, the scattered light may affect the quality of the commutation signals as noise. However, most of the scattered light generated by the reflection at the edges of the respective mirror surfaces 11' of the second array 2 of the micro movable element array X1 is blocked by the movable parts (i.e., the lend parts 11 and the frames 20) of the first array 1. Thus, if the micro movable element array X1 is used as a wavelength selective switch in a WDM communication system, for example, it is possible to reduce an influence of the scattered light on the communication signals.

In the respective micro movable elements Y1 of the micro movable element array X1, the electrode parts 12 of the inner movable part 10, the shield parts 14, the parts 22a of the second layer parts 22 of the frames 20, and the parts 32c of the second layer part 32 of the frame 30 are electrically coupled. Thus, the reference potential (for example, ground potential) is applied to the shield parts 14, the parts 22a and 32c as well as the electrode parts 12 at the time of driving the micro movable element Y1. Therefore, the electric field generated from the electrode parts 60 toward the land parts 11 side of the inner movable part 10, for example, due to the driving potential higher than the reference potential at the time of driving is easily absorbed by the shield parts 14. In other words, it is difficult for the electric field to go beyond the shield parts 14 to reach the land parts 11, for example. Further, the electric field generated from the electrode parts 60 at the time of driving is easily absorbed by the parts 22a. In other words, it is difficult for the electric field to go beyond the parts 22a side of the second layer parts 22 of the frames 20 to leak out of the elements. Further, the electric field generated from the electrode parts 80 to the side opposite to the electrode parts 70 due to the driving potential higher than the reference potential at the time of driving is easily absorbed by the parts 32c. In other words, it is difficult for the electric field to go beyond the parts 32c to leak out of the elements. These electric field absorption effects reduce or prevent the leak of the electric field out of the elements of the micro movable elements Y1. Because of the reduction or prevention of the leak of the electric field out of the elements, it is possible to prevent the electric field leaked from the driving mechanisms (electrode parts 12, 60, 70 and 80) of the respective micro movable element Y1 from affecting the driving property of other adjacent micro movable element Y1. Therefore, the electric field absorption effects contribute to increased density of the micro movable elements Y1 in the arrangement direction and thus improved population of the movable main parts (the land parts 11 and the mirror surfaces 11') in the arrangement direction.

The micro movable elements Y1 of the micro movable element array X1 can be sensing devices such as an angular sensor or an acceleration sensor. In the case of the micro movable elements Y1 being the sensing devices, the mirror surfaces 11' are not necessarily provided on the land parts 11 of the inner movable parts 10.

If the micro movable element Y1 functions as an angular sensor, the movable parts (i.e., the inner movable part 10, the frame 20, the coupling parts 40, and the electrode part 60) are oscillated around the axis A2 at a certain frequency or cycle, for example, at the time of driving the micro movable element Y1. This oscillation operation is implemented by applying the voltage between the electrode parts 70 and 80 at a certain frequency. In an embodiment, the driving potential is applied to the electrode part 80 at certain frequency while the electrode part 70 is coupled to ground.

When a predetermined angular velocity is applied to the micro movable element Y1 or the inner movable part 10 in such an oscillated state of the movable parts, the inner movable part 10 rotates around the axis A1 by a certain amount to change the positional relationship between the electrode parts 12 and 60, and thus the capacitance between the electrode parts 12 and 60 changes. The amount of the rotation of the inner movable part 10 may be detected based on the changes in the capacitance. The angular velocity applied to the micro movable element Y1 or the inner movable part 10 may be derived based on the detection result.

If the micro movable element Y1 functions as an acceleration sensor, a predetermined direct voltage is applied to between the electrode parts 12 and 60 to make the inner movable part 10 stationary with respect to the frame 20 and the electrode part 60, for example, at the time of driving the micro movable element Y1. In this state, when an acceleration in a normal direction (i.e., a direction perpendicular to a paper of a plane view of FIG. 5) is applied to the micro movable element Y1 or the inner movable part 10, an inertial force parallel with the acceleration acts. Then, the torque around the axis A1 defined by the pair of the coupling parts 40 is applied to the inner movable part 10, which causes the rotation (around the axis A1) of the inner movable part 10 proportional to the acceleration. The inertial force may be generated if the position of the center of gravity of the inner movable part 10 is designed not to be on the axis A1 in a plane view of FIG. 5. The amount of the rotation may be detected electrically as a change in the capacitance between the electrode parts 12 and 60. The acceleration applied to the micro movable element Y1 or the inner movable part 10 may be derived based on the detection result.

Figure 16:
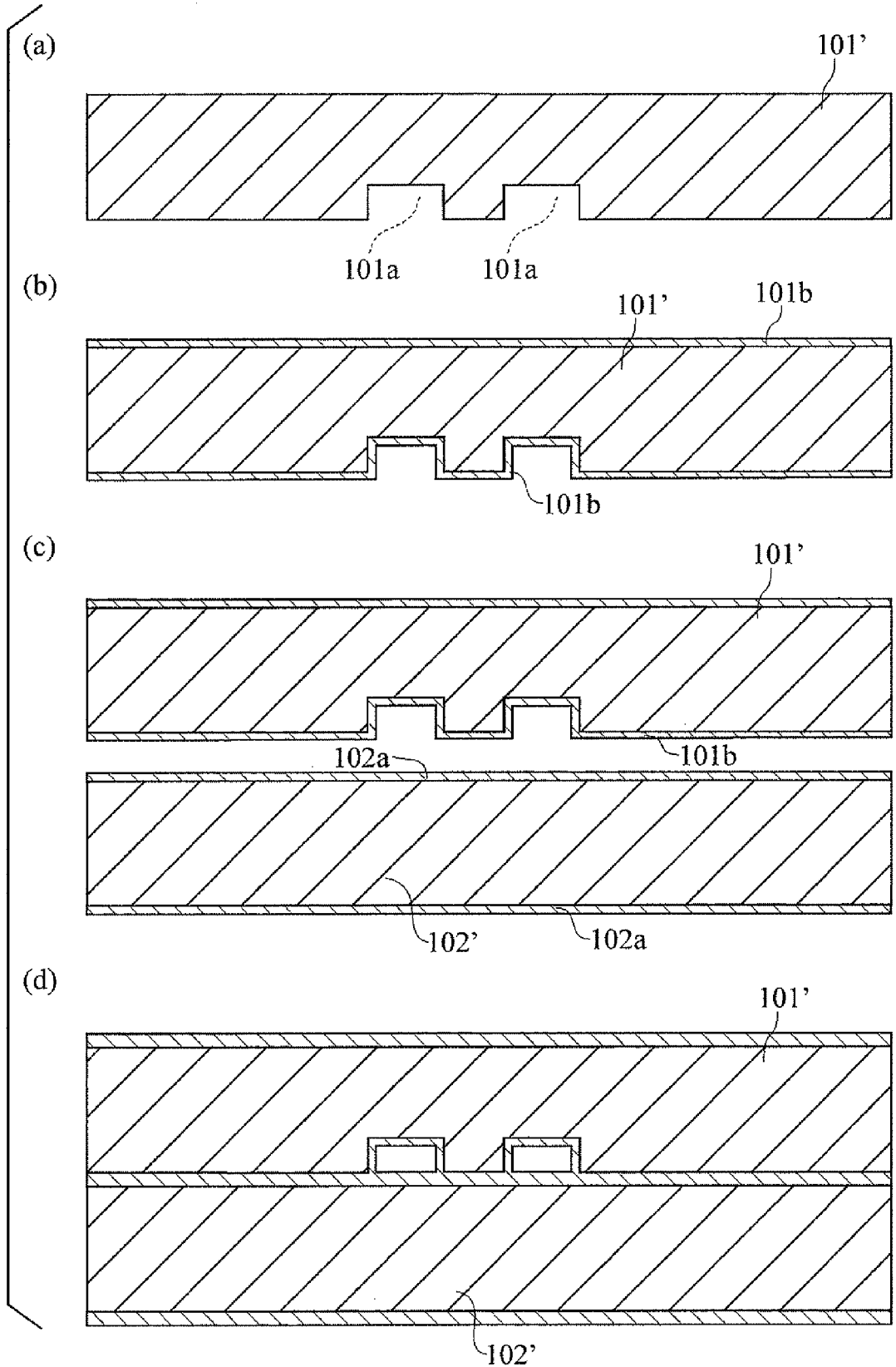
FIG. 16 is a diagram illustrating a part of processes in a way of manufacturing the micro movable element.
Figure 17:
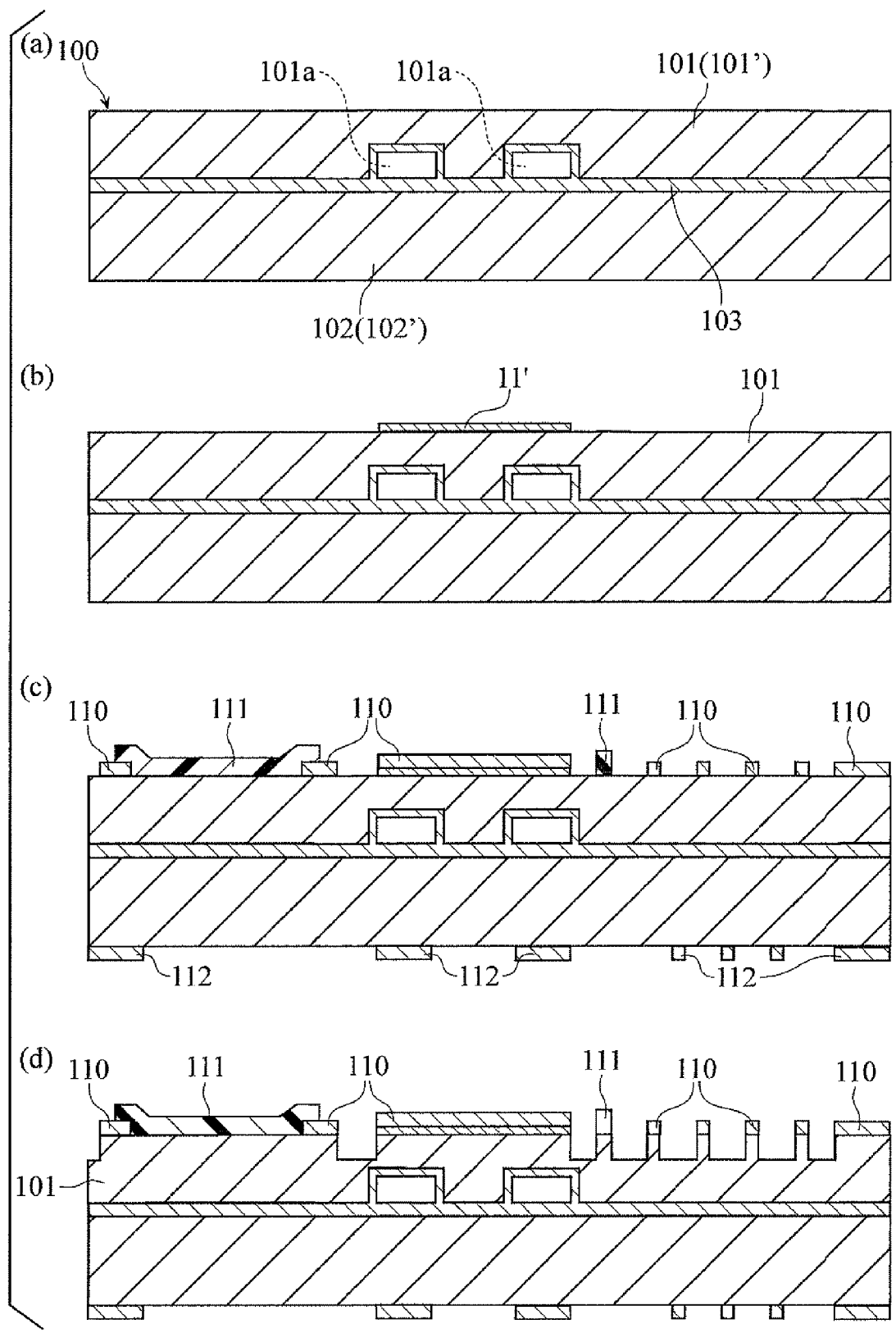
FIG. 17 is a diagram illustrating processes subsequent to the processes of FIG. 16.
Figure 18:
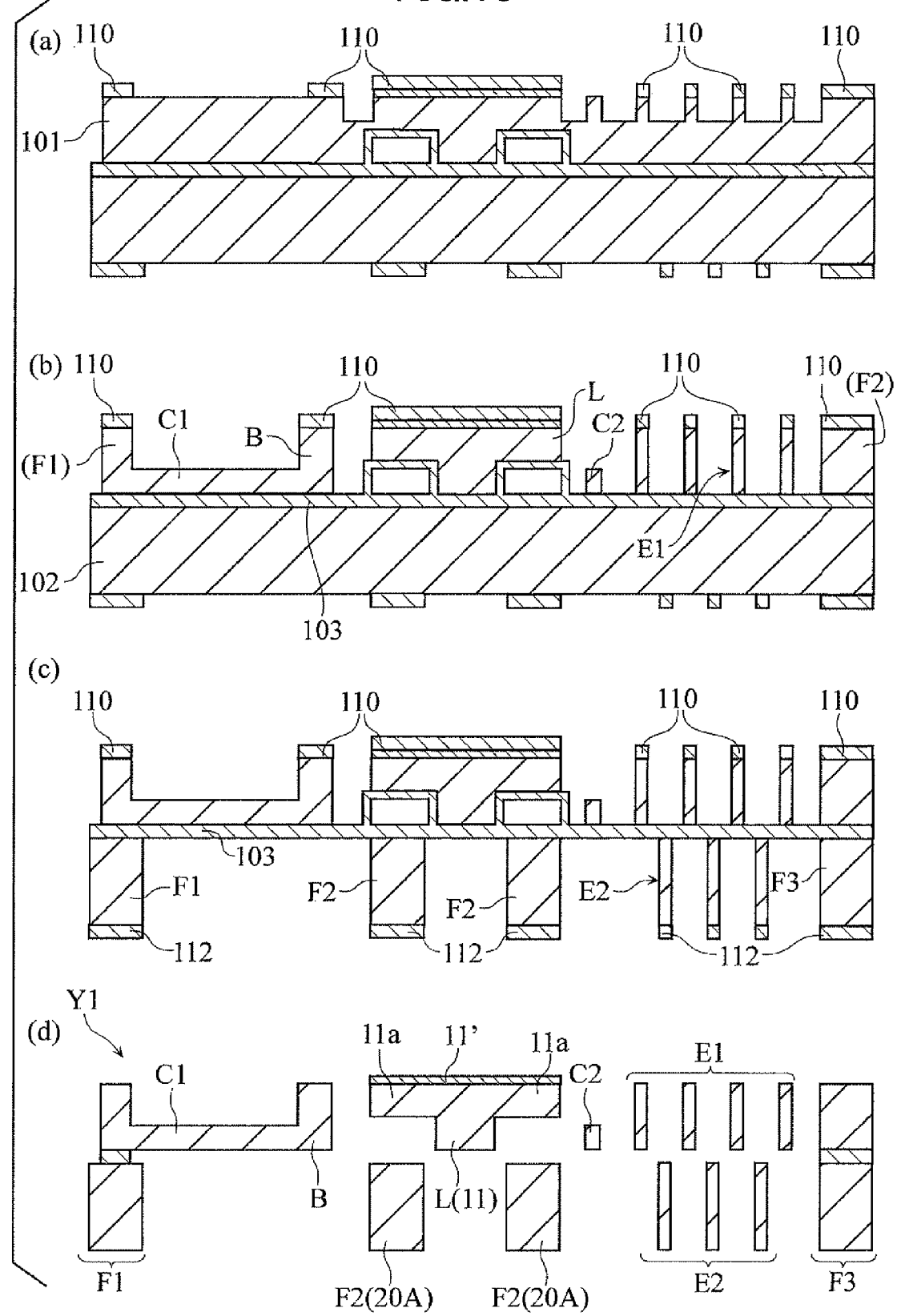
FIG. 18 is a diagram illustrating processes subsequent to the processes of FIG. 17.

FIGS. 16-18 illustrate an example of a way of manufacturing the micro movable element Y1 included in the micro movable element array Y1. The way is an example for manufacturing the respective micro movable elements Y1 using the MEMS technique. In FIGS. 16-18, a forming process of a land part L, a beam part L, frames F1, F2 and F3, coupling parts C1 and C2, and a pair of electrodes E1 and E2 illustrated in FIG. 18 (d) is illustrated by changes in a single cross-section. The single cross-section is expressed as a continuous cross-section by modeling plural cross-sections at predetermined locations included in a single micro movable element forming section in a wafer to be processed. The land part L corresponds to a part of the land part 11. The beam part B corresponds to the beam part 13. The frame F1 corresponds to a part of the frame 20. The frame F2 corresponds to the extended part 20A of the frame 20 (i.e., a part of the parts 22a of the second layer part 22). The frame F3 corresponds to a part of the frame 30. The coupling part C1 corresponds to the coupling part 40 and illustrates a cross-section of the torsion bar 41 in the longitudinal direction. The coupling part C2 corresponds to one of the coupling parts 40, 50A and 50B and illustrates a transverse section of the corresponding torsion bar 41. The electrode E1 corresponds to a part of the electrode parts 12 and 70 and illustrates a transverse section of the pair of the electrode teeth 12a and the pair of the electrode teeth 71. The electrode E2 corresponds to a part of the electrode parts 60 and 80 and illustrates a transverse section of the pair of the electrode teeth 61 and the pair of the electrode teeth 82.

In order to manufacture the micro movable element Y1, at first, a silicon wafer 101' such as illustrated in FIG. 16 (a) is prepared. The silicon wafer 101' includes grooves 101a extending at locations where the thin opposed parts 11a of the land part 11 are formed. In order to make such a silicon wafer 101', DRIE (deep reactive ion etching) to a predetermined depth (30 μm, for example) is performed on an unprocessed wafer with a thickness of 200 μm, for example, utilizing a resist pattern as a mask which includes openings corresponding to the grooves 101a. In DRIE, a favorable anisotropic etching process can be implemented in a Bosch process in which etching with $SF_6$ gas and protecting sidewalls with $C_4F_8$ gas are repeated alternately. Such a Bosch process may be adopted in the DRIE described hereinafter. Further, the silicon wafer 101' is made from silicon material which has impurities doped therein to have an electrical conductivity. The impurities may include a p-type impurity such as B or an n-type impurity such as P and Sb.

Next, as illustrated in FIG. 16 (b), an insulating film 101b is formed on the silicon wafer 101'. The insulating film 101b may be formed by oxidizing the surface of the silicon wafer 101' using a thermal oxidation process, for example. The thickness of the insulating film 101b is 500 nm, for example. After this process, plural electrically conductive parts (not illustrated), which form corresponding parts of the respective electrically conductive vias (including the electrically conductive vias 16, 24-26, 34 and 35), are embedded in the insulating film 101b. Specifically, opening parts are formed in the insulating film 101b at predetermined locations and the opening parts are filled with electrically conductive materials. The electrically conductive materials may include tungsten or polysilicon, for example.

Next, the silicon wafer 102' having an insulating film 102a on its surface, as illustrated in FIG. 16 (c), is prepared. The silicon wafer 102' is made from silicon material which has impurities doped therein to have an electrical conductivity. The impurities may include a p-type impurity such as B or an n-type impurity such as P and Sb. The thickness of the silicon wafer 102' is 200 μm, for example. The thickness of the insulating film 102a is 500 nm, for example. The insulating film 102a may be formed by oxidizing the surface of the silicon wafer 102' using a thermal oxidation process, for example. Further, plural electrically conductive parts (not illustrated), which form corresponding parts of the respective electrically conductive vias (including the electrically conductive vias 16, 24-26, 34 and 35), are embedded in the insulating film 102a. The electrically conductive parts may be formed by forming opening parts in the insulating film 102a at predetermined locations and filling the opening parts with the electrically conductive materials. The electrically conductive materials may include tungsten or polysilicon, for example.

Next, as illustrated in FIG. 16 (d), the silicon wafers 101' and 102' are registered and then bonded to each other. In this way, the respective electrically conductive vias are formed by the electrically conductive parts embedded in the insulating film 101b and the electrically conductive parts embedded in the insulating film 102a. In order to bond the silicon wafers 101' and 102', for example, the silicon wafers 101' and 102' are cleaned by an ammonia solution, bonded together in a clean circumstance, and then annealed in an atmosphere of nitrogen, at 1200 degree Celsius, for example.

Next, the silicon wafers 101' and 102' are polished separately to have desired thicknesses, as illustrated in FIG. 17 (a). In this way, a material substrate 100 as a SOI wafer having a multilayered structure is obtained which includes a silicon layer 101 including the grooves 101a, a silicon layer 102, and an insulating layer 103 between the silicon layers 101 and 102. The electrically conductive vias (including the electrically conductive vias 16, 24-26, 34 and 35) are embedded in the insulating layer 103 of the material substrate 100. The thickness of the silicon layer 101 is within a range from 20 μm to 200 μm, for example, the thickness of the silicon layer 102 is within a range from 20 μm to 200 μm, for example, and the thickness of the insulating layer 103 is within a range from 0.3 μm to 2 μm, for example.

Next, as illustrated in FIG. 17 (b), the mirror surface 11' is formed on the silicon layer 101. In order to form the mirror surface 11', at first, a Cr film (50 nm), for example, and then an Au film (200 nm) are formed on the silicon layer 101, by a sputtering process. Next, the mirror surface 11' is pattern-formed by successively etching these metal films via masks. The etchant for Au may be a potassium iodide-iodine solution, for example. The etchant for Cr may be a di-ammonium cerium nitrate, for example.

Figure 19:
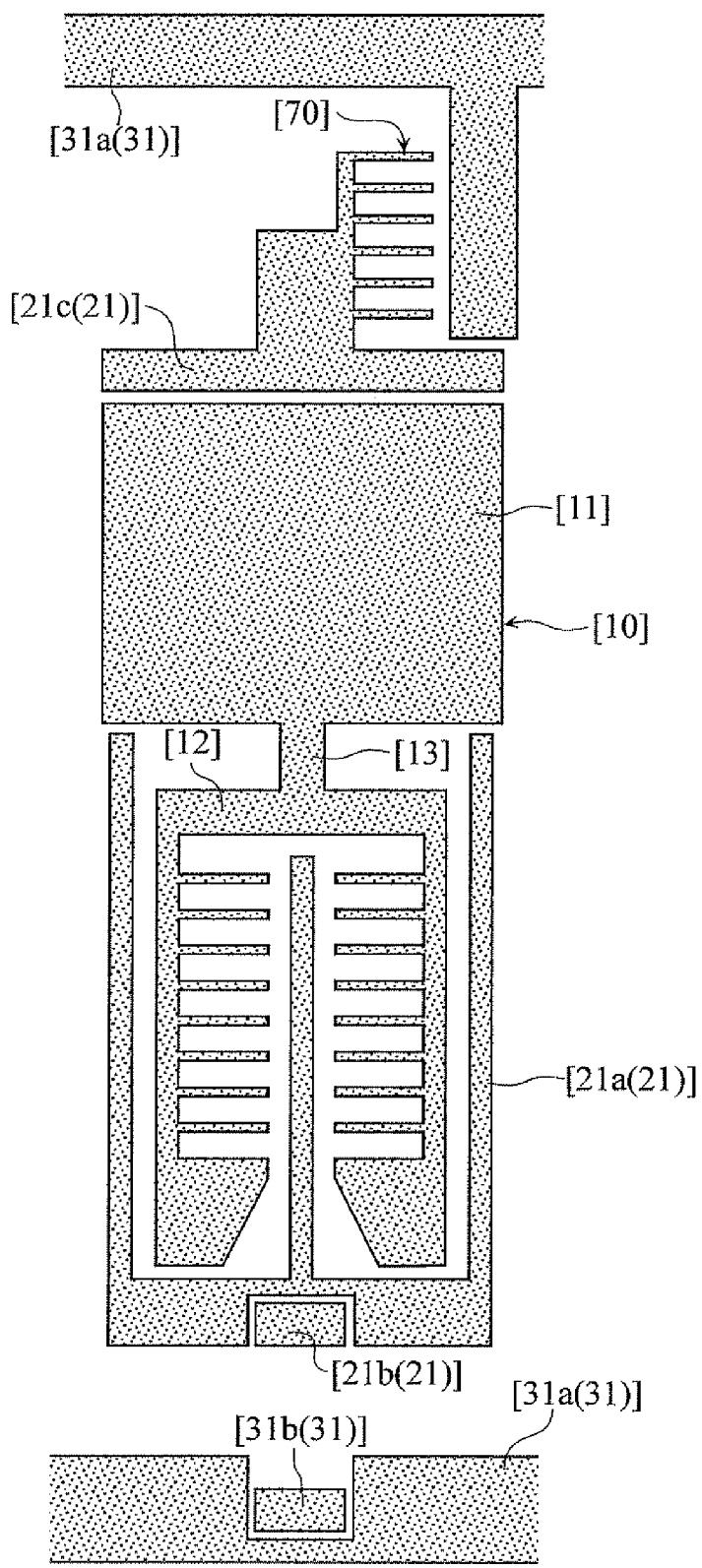
FIG. 19 is a plane view of a mask pattern.
Figure 20:
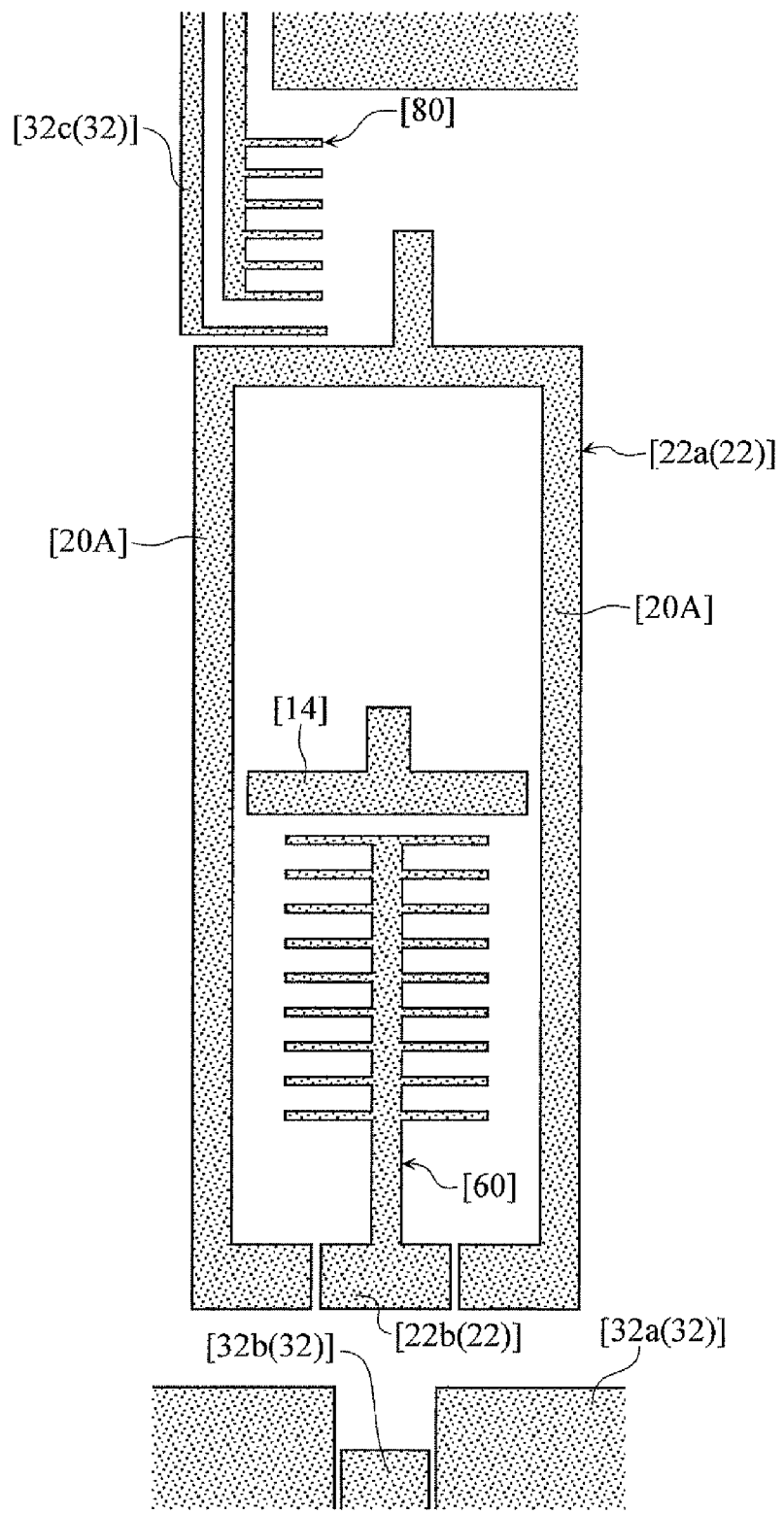
FIG. 20 is a plane view of another mask pattern.

Next, as illustrated in FIG. 17 (c), an oxide film pattern 110 and a resist pattern 111 are formed on the silicon layer 101 and an oxide film pattern 112 is formed on the silicon layer 102. The oxide film pattern 110 has a pattern shape, as illustrated in FIG. 19, which corresponds to a part of the inner movable part 10 (including the land part 11, the electrode part 12 and the beam part 13), the first layer part 21 of the frame 20, the first layer part 31 of the frame 30 and the electrode part 70 to be formed in the silicon layer 101. To form the oxide film pattern 110, an oxide material is deposited on the material substrate 100 of the silicon layer 101 side, by a sputtering or CVD process, for example, and then the oxide material film is subject to patterning. The resist pattern 111 has a pattern shape corresponding the coupling parts 40, 50A and 50B. In order to form the resist pattern 111, the resist material is deposited on the material substrate 100 of the silicon layer 101 side, by a spin coating process, for example, and then the resist film is subject to patterning. The oxide film pattern 112 has a pattern shape, as illustrated in FIG. 20, which corresponds to the shield part 14 of the inner movable part 10, the second layer part 22 of the frame 20, the second layer part 32 of the frame 30 and the electrode parts 60 and 80 to be formed in the silicon layer 102. To form the oxide film pattern 112, an oxide material is deposited on the material substrate 100 of the silicon layer 102 side, by a sputtering or CVD process, and then the oxide material film is subject to patterning.

Next, as illustrated in FIG. 17 (d), DRIE to a desired depth is performed on the silicon layer 101 utilizing the oxide film pattern 110 and the resist pattern 111 as a mask. The desired depth corresponds to the thickness of the coupling part C1 and C2, and is 5 μm, for example.

Next, as illustrated in FIG. 18 (a), the resist pattern 111 is removed. For example, the resist pattern 111 may removed by the action of a predetermined release agent.

Next, DRIE is performed on the silicon layer 101 while remaining the coupling parts C1 and C2 utilizing the oxide film pattern 110 as a mask, as illustrated in FIG. 18 (b). In this process, the land part L, the beam part B, the electrode E1, a part of the frame F1 (the first layer part 21 of the frame 20), a part of the frame F3 (the first layer part 31 of the frame 30) and the coupling parts C1 and C2 are formed.

Next, as illustrated in FIG. 18 (c), DRIE is performed on the silicon layer 102 utilizing the oxide film pattern 112 as a mask. In this process, a part of the frame F1 (the second layer part 22 of the frame 20), the frame F2 (the extend parts 20A which is a part of the second layer part 22 of the frame 20), a part of the frame F3 (the second layer part 32 of the frame 30) and the electrode E2 are formed.

Next, as illustrated in FIG. 18 (d), exposed regions of the insulating layer 103 and the oxide film patterns 110 and 112 are removed by etching. The etching process may be a dry etching process or a wet etching process. In the case of the dry etching, the etching gas may be $CF_4$ or $CHF_3$, etc., for example. In the case of the wet etching, the etchant may be Buffered Hydrofluoric acid (BHF) comprised of hydrofluoric acid and ammonium fluoride.

According to the a series of processes described above, the land part L, the micro movable element Y can be manufactured by forming or the like of the beam part B, the frames F1, F2 and F3, the coupling parts C1 and C2, and the pair of the electrodes E1 and E2. The first and second arrays of the micro movable element array X1 can be manufactured by performing these processes on a micro movable element basis.

In order to manufacture the micro movable element array X1, at first, the base part 3 is formed by patterning the reference potential wiring and the pairs of the driving wirings on the substrate. Next, the spacers 5 are formed on the base part 3 by wire bonding. Next, after the electrically conductive adhesive has been applied to the apexes of the head parts of the spacers 5, the base part 3 and the second array 2 are registered and then bonded via the spacers 5 and electrically conductive adhesive. Next, the spacers 4 are formed on the second array 2 by wire bonding. Next, after the electrically conductive adhesive has been applied to the apexes of the head parts of the spacers 4, the first array 1 and the second array 2 (including the base part 3) are registered and then bonded via the spacers 4 and electrically conductive adhesive.

Figure 21:
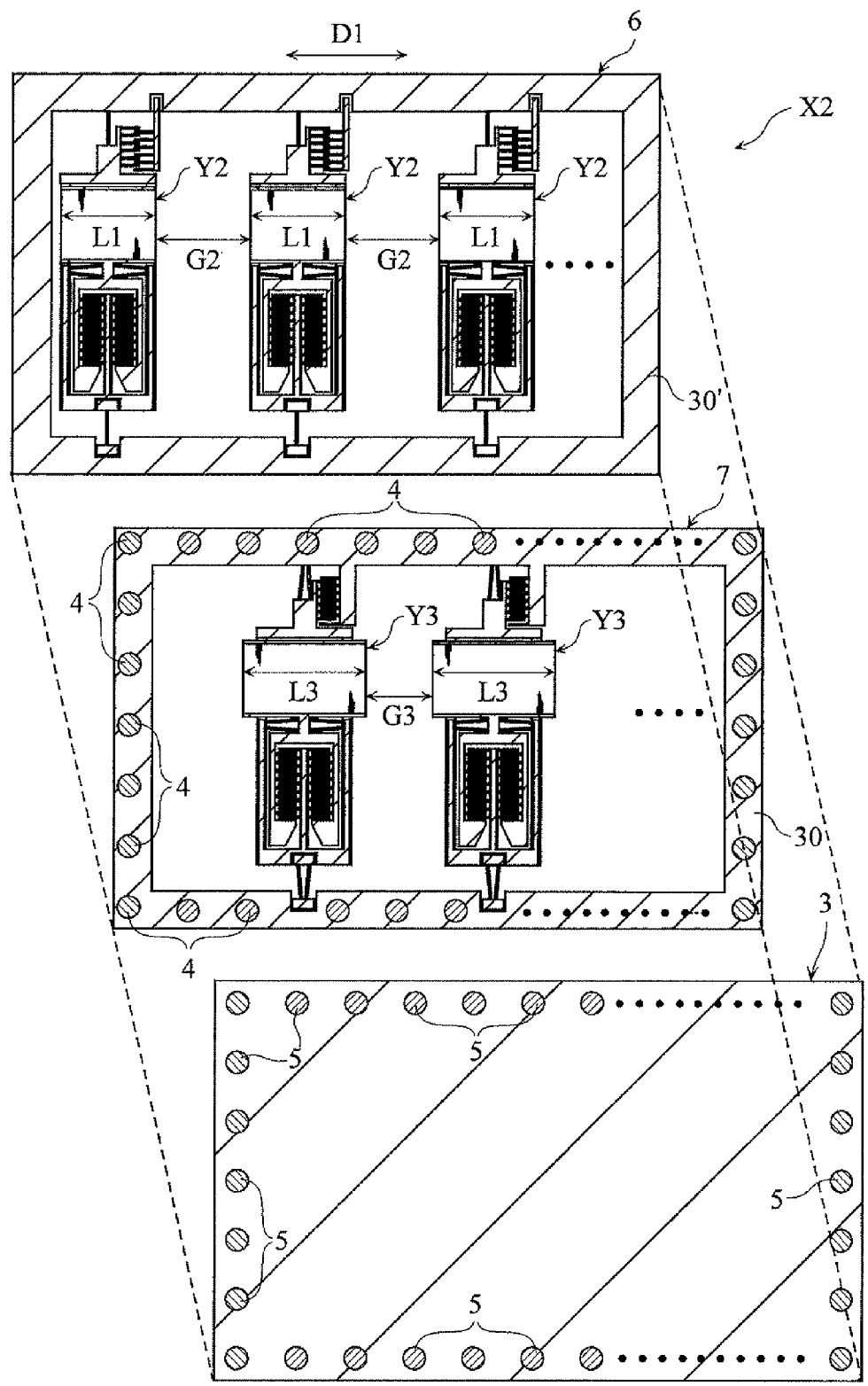
FIG. 21 is an exploded partly omitted plane view of a micro movable element array according to a second embodiment.
Figure 22:
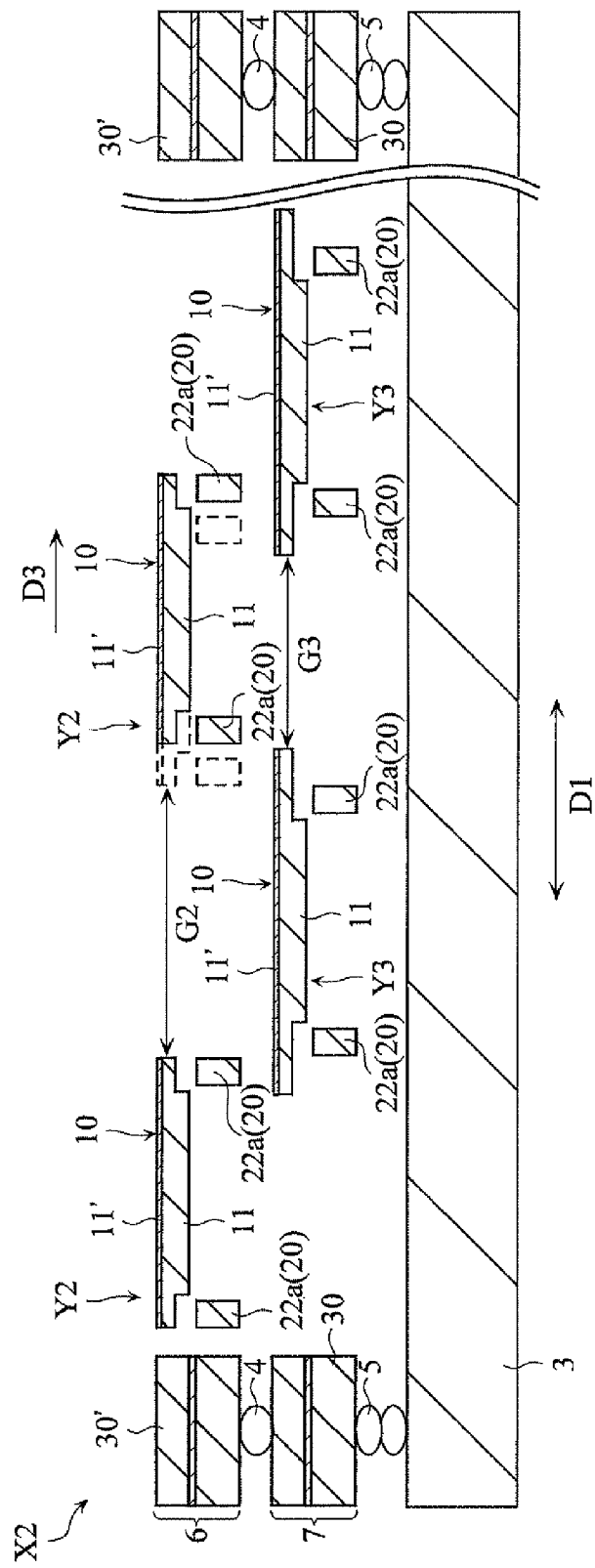
FIG. 22 is a partly omitted cross-sectional view of the micro movable element array according to the second embodiment.

FIGS. 21 and 22 illustrate a micro movable element array X2 according to a second embodiment. FIG. 21 is an exploded partly omitted plane view of the micro movable element array X2. FIG. 22 is a partly omitted cross-sectional view of the micro movable element array X2.

The micro movable element array X2 is a micro-mirror element array in the embodiment and includes a first array 6, a second array 7, the base part 3, the spacers 4 and the spacers 5. The spacers 4 are provided between the first and second arrays 6 and 7 and the spacers 5 are provided between the second array 7 and the base part 3. The base part 3 is a wiring board (wirings are omitted in FIGS. 21 and 22). A part of the first array 6 is electrically coupled to a part of the wirings of the base part 3 via a part of the spacers 4, a part of the second array 7 and a part of the spacers 5. A part of the second array 7 is electrically coupled to a part of the wirings of the base part 3 via a part of the spacers 5. The spacers 4 and 5 for the electrical coupling are made from an electrically conductive material. For example, the spacers 4 and 5 are single or multilayered gold bumps.

Figure 23:
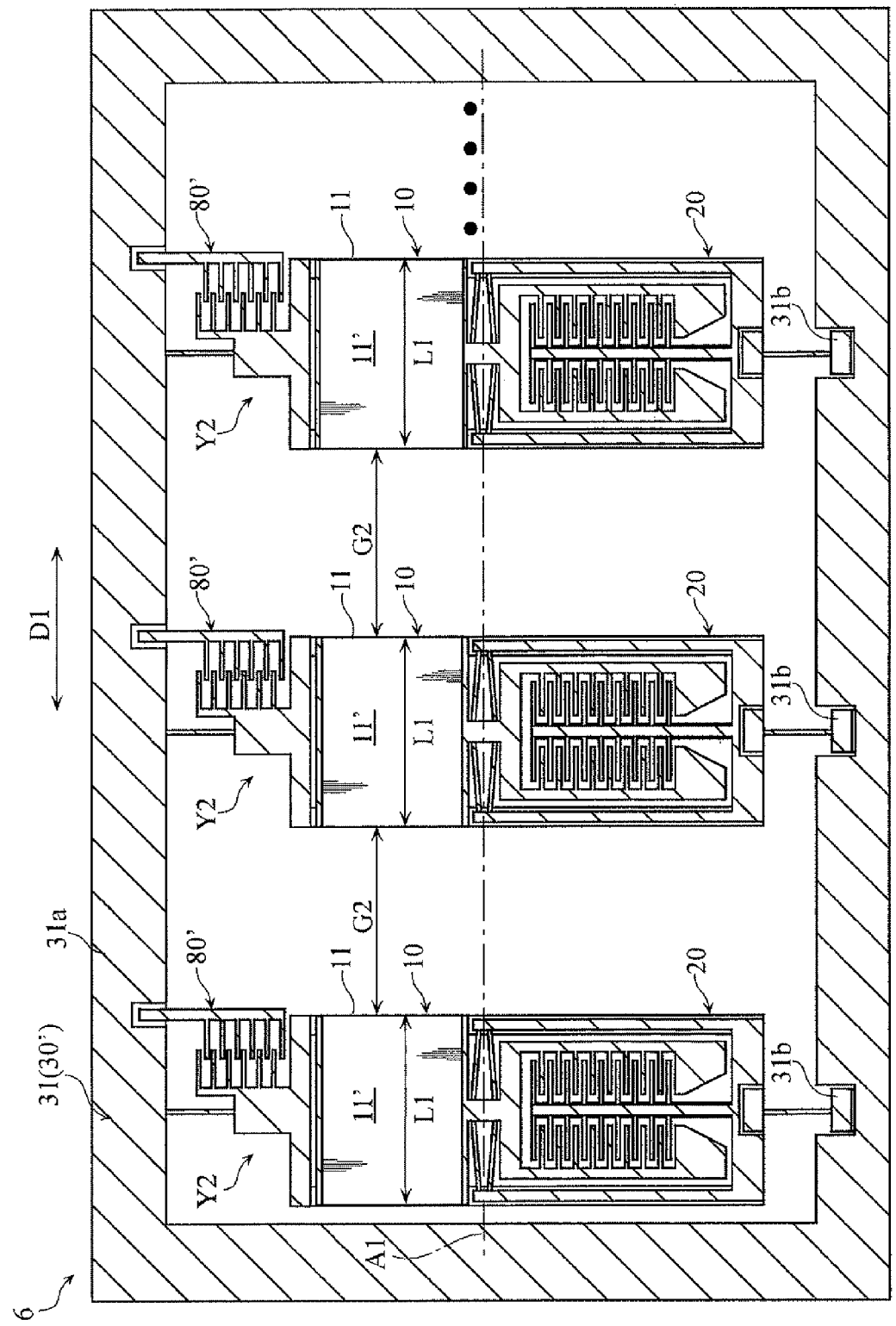
FIG. 23 is a plane view of a first array illustrated in FIG. 21.
Figure 24:
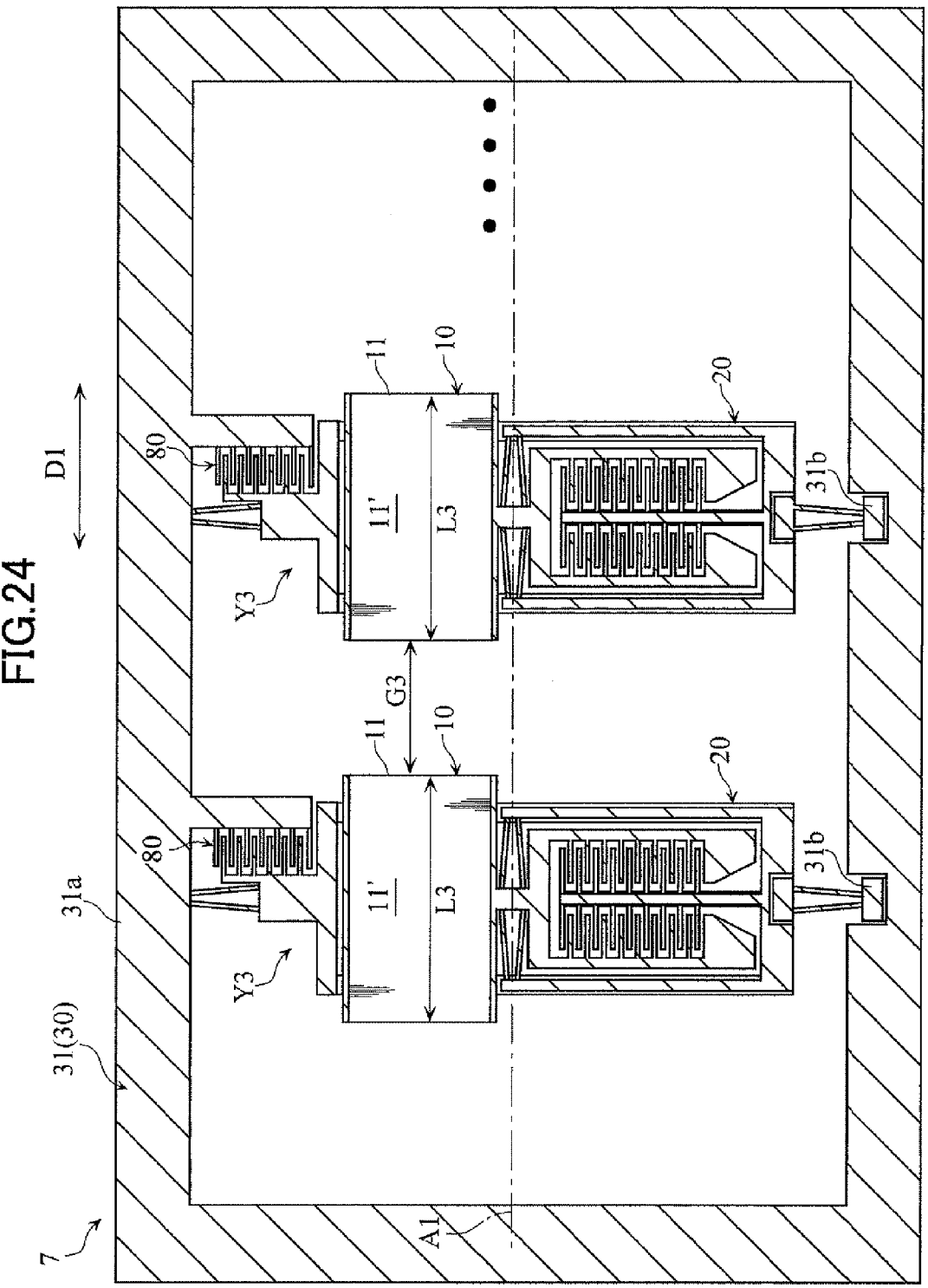
FIG. 24 is a plane view of a second array illustrated in FIG. 21.

FIG. 23 is a partly omitted plane view of the first array 6. The first array 6 includes plural micro movable elements Y2. It is noted that in FIG. 23 some of the micro movable elements Y2 are omitted. FIG. 24 is a partly omitted plane view of the second array 7. The second array 7 includes plural micro movable elements Y3. It is noted that in FIG. 24 some of the micro movable elements Y3 are omitted.

Figure 25:
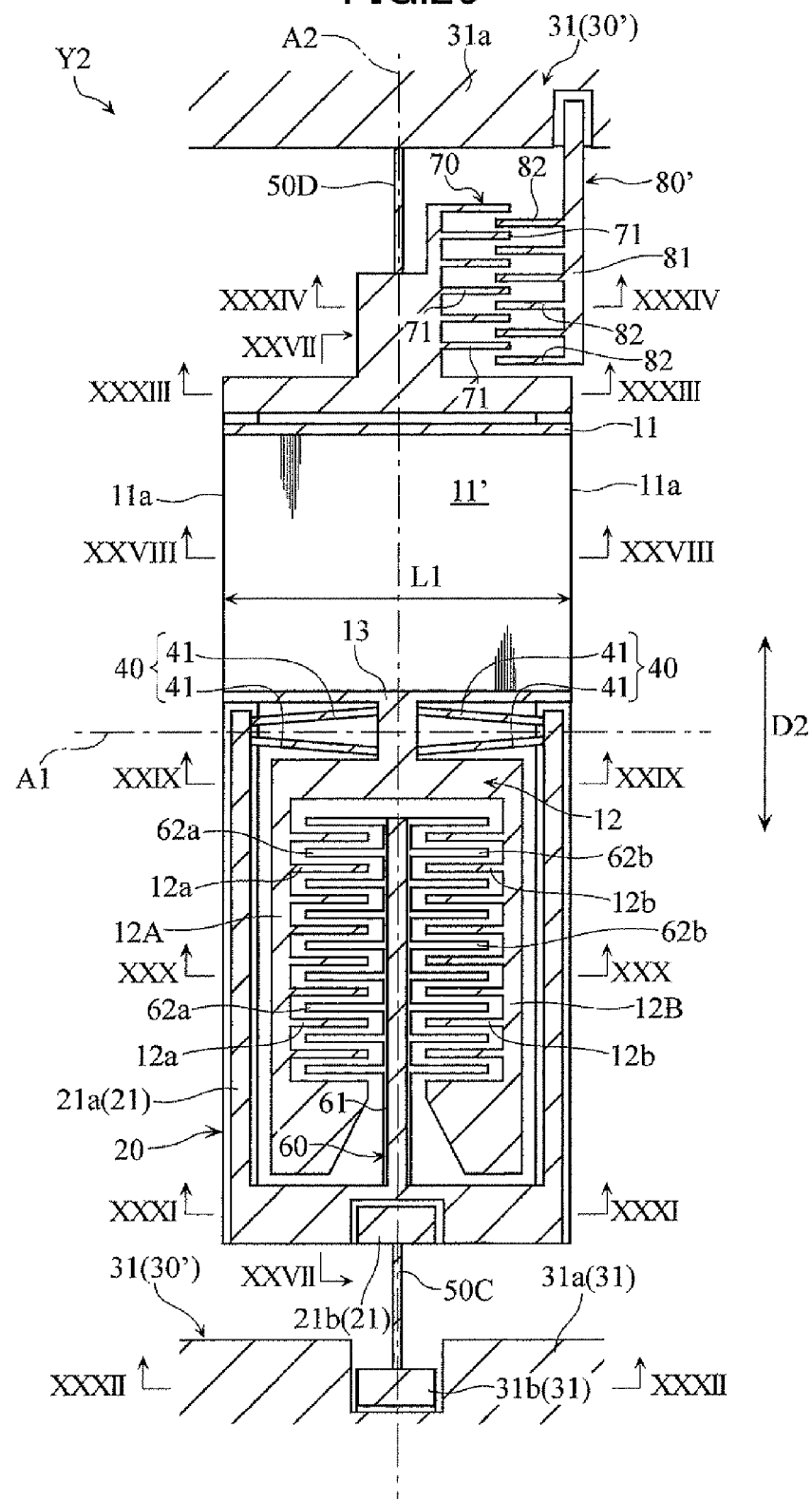
FIG. 25 is a plane view of a micro movable element included in the first array in the second embodiment.
Figure 26:
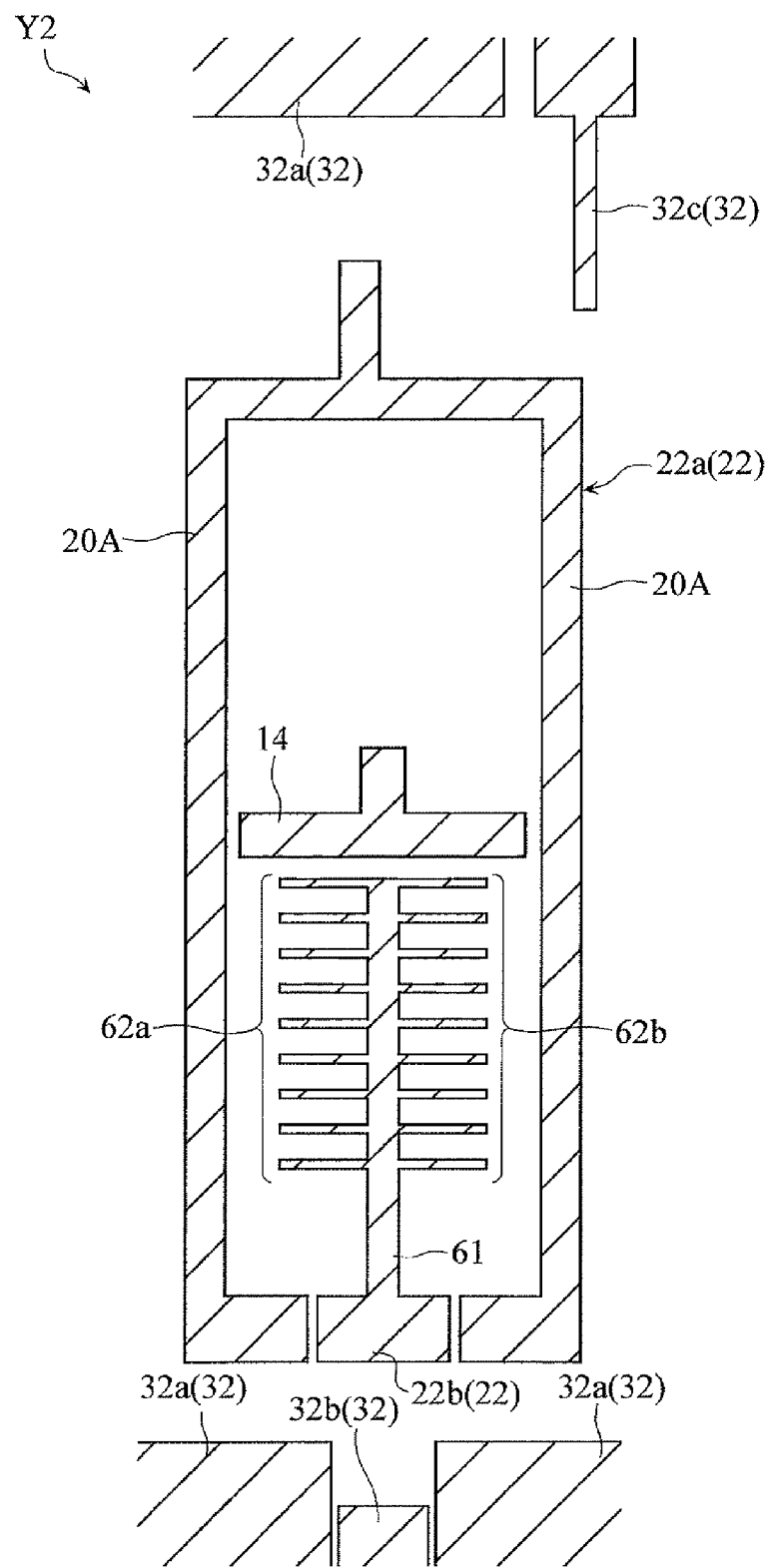
FIG. 26 is a partly omitted plane view of the micro movable element illustrated in FIG. 25.

FIGS. 25-34 illustrate the micro movable elements Y2 included in the first array 6. FIG. 25 is a plane view of the micro movable element Y2. FIG. 26 is a partly omitted plane view of the micro movable element Y2. FIGS. 27-34 are enlarged cross-sectional views along lines XXVII-XXVII, XXXVIII-XXXVIII, XXIX-XXIX, XXX-XXX, XXXI-XXXI, XXXII-XXXII, XXXIII-XXXIII and XXXIV-XXXIV, respectively.

The micro movable element Y2 is a micro-mirror element in the embodiment and includes an inner movable part 10, a frame 20 as an outer movable part, a frame 30' as a stationary part, a pair of coupling parts 40, a pair of coupling parts 50C and 50D, and electrode parts 60, 70 and 80'. The micro movable element Y2 differs from the micro movable element Y1 described above in that it includes the frame 30', the pair of coupling parts 50C and 50D, and the electrode part 80' instead of the frame 30, the pair of coupling parts 50A and 50B, and the electrode part 80, respectively. The configuration of the micro movable element Y2 is the same as the micro movable element Y1 except for the frame 30', the pair of coupling parts 50C and 50D, and the electrode part 80'. Further, the micro movable element Y2 is manufactured by processing a material substrate which is the SOC wafer using the MEMS technique, as is the case with the micro movable element Y1. The material substrate has a multilayered structure which includes a first silicon layer, a second silicon layer and an insulating layer between the first and second first silicon layers. The silicon layers have impurities doped therein to have a predetermined electrical conductivity. The respective parts of the micro movable element Y2 mainly originate from the first silicon layer and/or the second silicon layer. For the sake of clarity of drawings, in FIGS. 23 and 25, the parts originating from the first silicon layer are indicated by oblique line hatchings. Further, the structure illustrated in FIG. 26 is the part of the micro movable element Y2 which originates from the second silicon layer.

Figure 32:
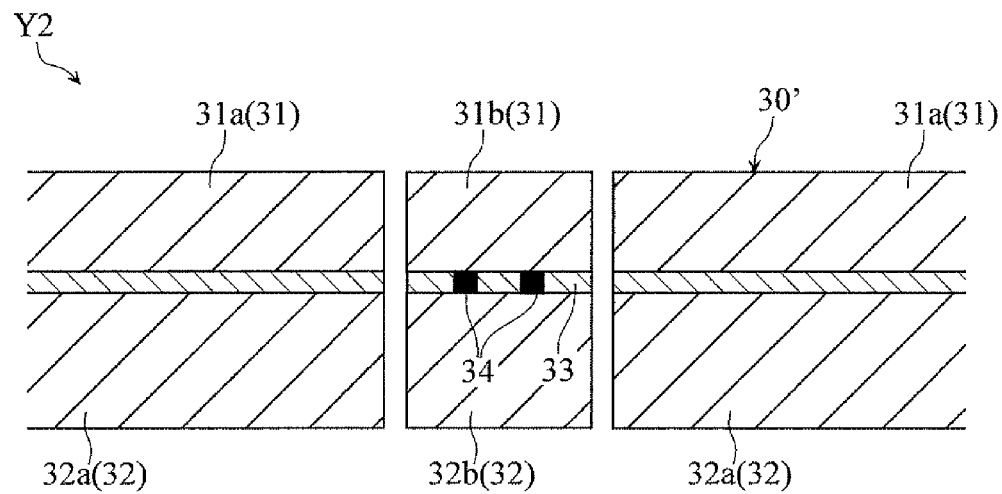
FIG. 32 is an enlarged cross-sectional view along a line XXXII-XXXII in FIG. 25.
Figure 33:
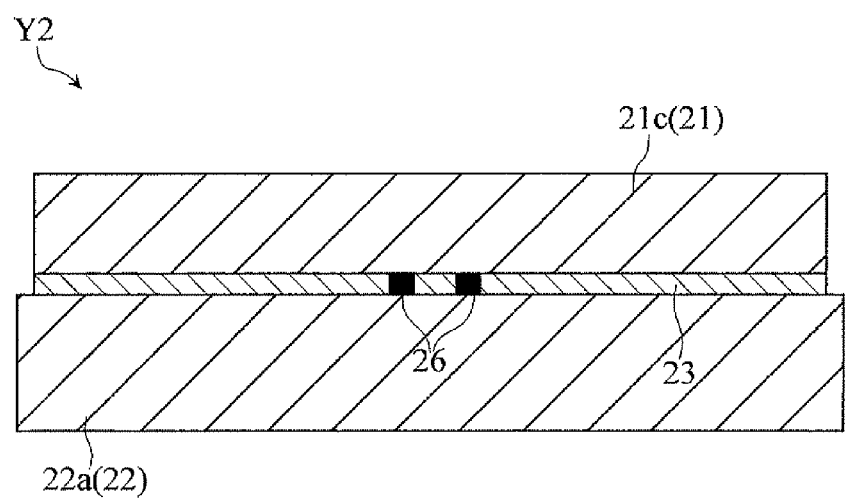
FIG. 33 is an enlarged cross-sectional view along a line XXXIII-XXXIII in FIG. 25.

The frame 30' has a multilayered structure which includes a first layer part 31 originating from the first silicon layer, a second layer part 32 originating from the second silicon layer, and an insulating layer 33 between the first and second layer parts 31 and 32, as illustrated in FIG. 32. The first layer part 31 includes parts 31a and 31b which are apart from each other, as illustrated in FIGS. 25 and 32. The part 31a includes parts which are apart from each other (not illustrated). The second layer part 32 includes parts 32a, 32b and 32c which are apart from each other, as illustrated in FIGS. 26 and 32. The part 32a includes parts which are apart from each other (not illustrated). The parts 31b and 32b are electrically coupled via electrically conductive vias 34 penetrating the insulating layer 33, as illustrated in FIG. 32.

Figure 27:
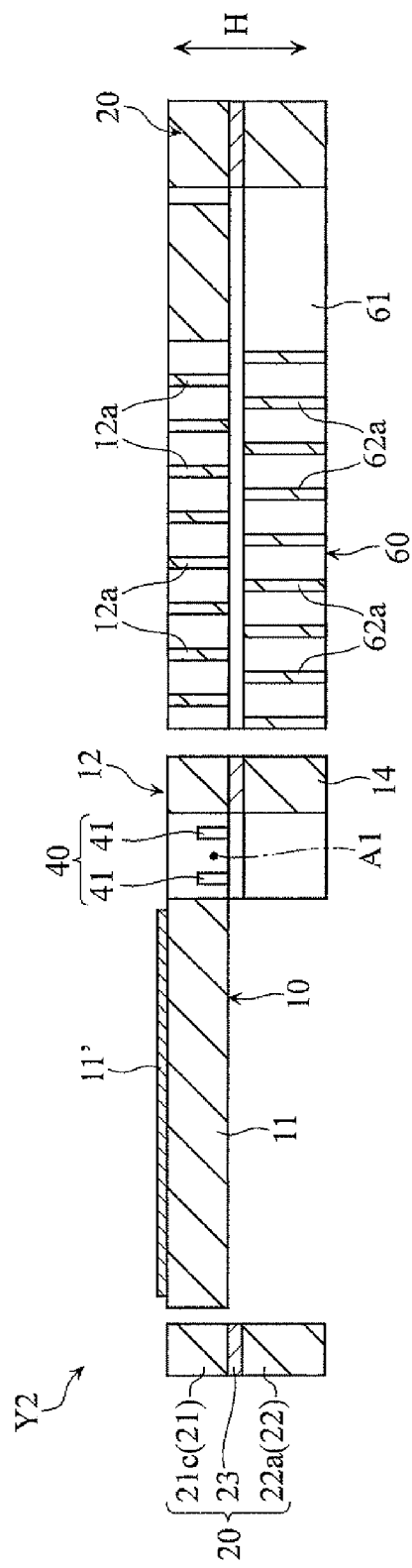
FIG. 27 is an enlarged cross-sectional view along a line XXVII-XXVII in FIG. 25.
Figure 28:
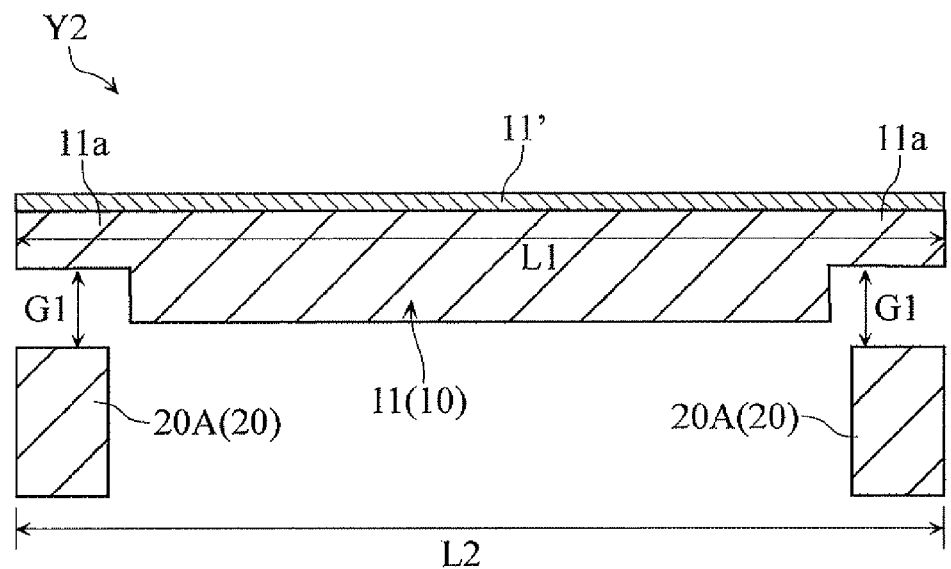
FIG. 28 is an enlarged cross-sectional view along a line XXVIII-XXVIII in FIG. 25.
Figure 29:
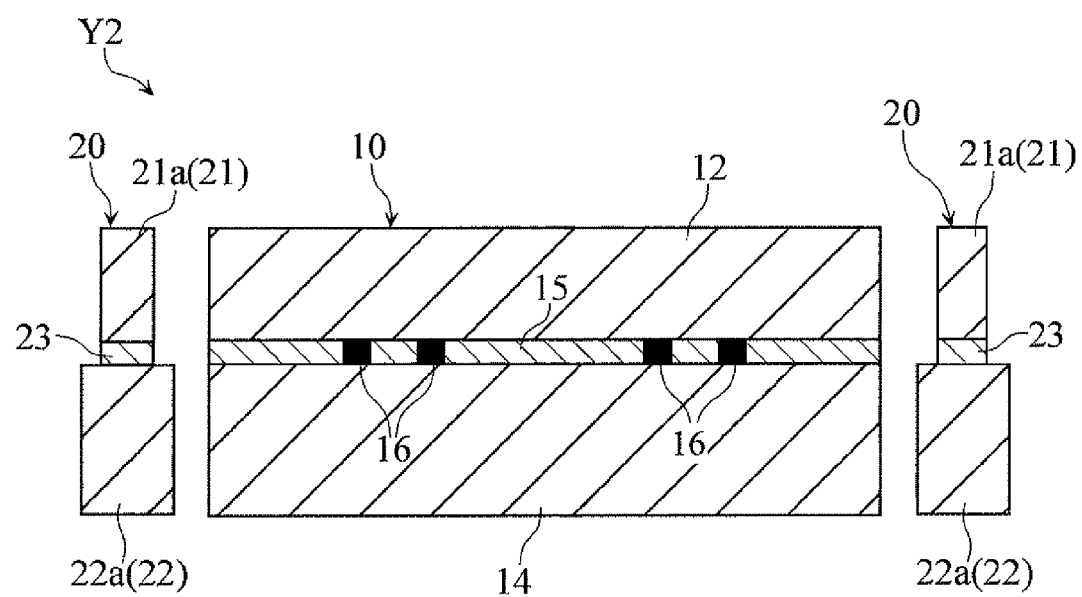
FIG. 29 is an enlarged cross-sectional view along a line XXIX-XXIX in FIG. 25.
Figure 30:
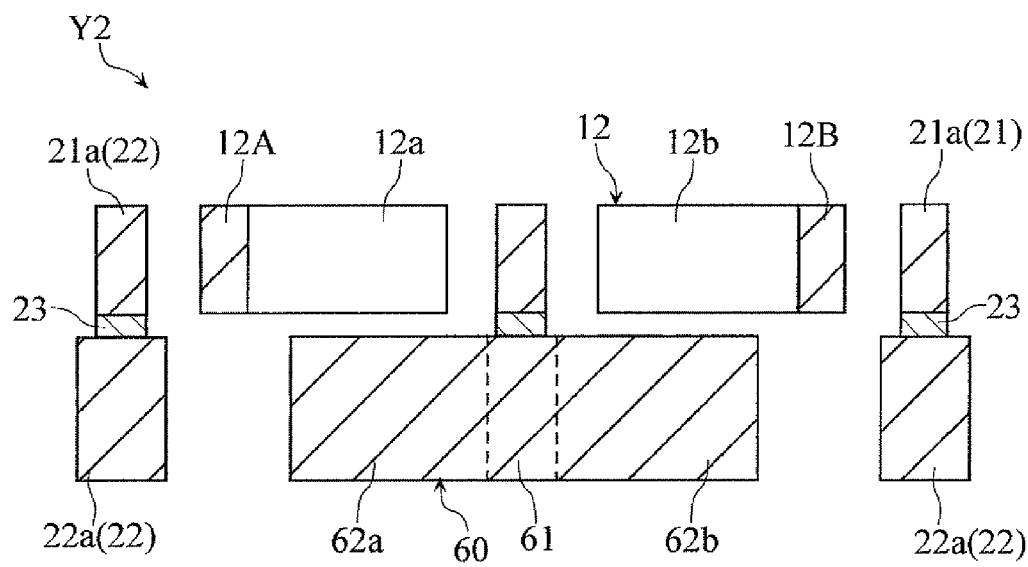
FIG. 30 is an enlarged cross-sectional view along a line XXX-XXX in FIG. 25.
Figure 31:
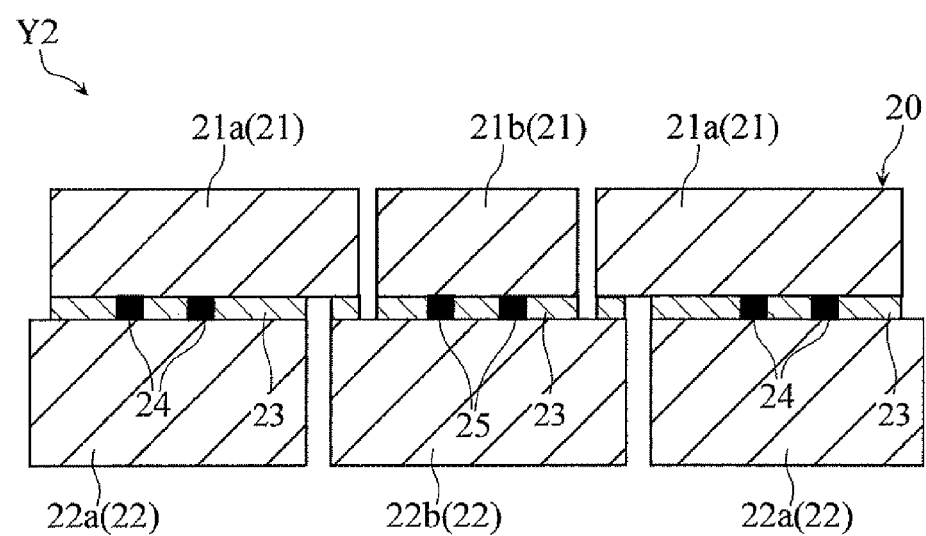
FIG. 31 is an enlarged cross-sectional view along a line XXXI-XXXI in FIG. 25.

The paired coupling parts 40 include two torsion bars 41, respectively, as illustrated in FIG. 25. The coupling parts 40 are portions originating from the first silicon layer. The coupling parts 40 couple to the beam portion 13 of the inner movable part 10 and the part 21a of the first layer part 21 of the frame 20 to couple the inner movable part 10 and the frame 20. The beam part 13 and the part 21a are electrically coupled via the coupling parts 40. The spacing between two torsion bars 41 which form the respective coupling parts 40 gradually increases, when viewed from the frame 20 side to the inner movable part 10 side. Further, the torsion bars 41 are thinner than the inner movable part 10 and the first layer part 21 of the frame 20 in the thickness direction H, as illustrated in FIG. 27. The pair of the coupling parts 40 defines the axis A1 of the rotation of the inner movable part 10 or the movable main part (the land part 11 and the mirror surface 11'). The extending direction of the electrode teeth 12a and 12b are parallel with the extending direction of the axis A1. The coupling parts 40, each of which includes two torsion bars 41 such that the spacing between the torsion bars 41 gradually increases when viewed from the frame 20 side to the inner movable part 10 side, are suited for preventing an unnecessary displacement component from being generated when the inner movable part 10 operates.

The paired coupling parts 50C, 50D include an elastic bar, respectively, as illustrated in FIG. 25. The coupling parts 50C, 50D are portions originating from the first silicon layer and couple the frame 20 and the frame 30'. Specifically, as illustrated in FIG. 25, the coupling part 50C couples the part 21b of the first layer part 21 of the frame 20 and the part 31b of the first layer part 31 of the frame 30' to couple the frame 20 and the frame 30'. The parts 21b and 31b are electrically coupled via the coupling part 50C. The coupling part 50D couples the part 21c of the first layer part 21 of the frame 20 and a part of the part 31a of the first layer part 31 of the frame 30' to couple the frame 20 and the frame 30'. The part 21c and the part of the part 31a are electrically coupled via the coupling part 50D. Further, as is the case with the torsion bars 41, the coupling parts 50C, 50D are thinner than the first layer part 21 of the frame 20 and the first layer part 31 of the frame 30' in the thickness direction H. The paired coupling parts 50C, 50D are elastic portions for supporting the micro movable element Y2 such that the movable parts (the inner movable part 10, the frame 20, the coupling parts 40, and the electrode parts 60 and 70) can perform a translational movement in the direction of the axis A1.

Figure 34:
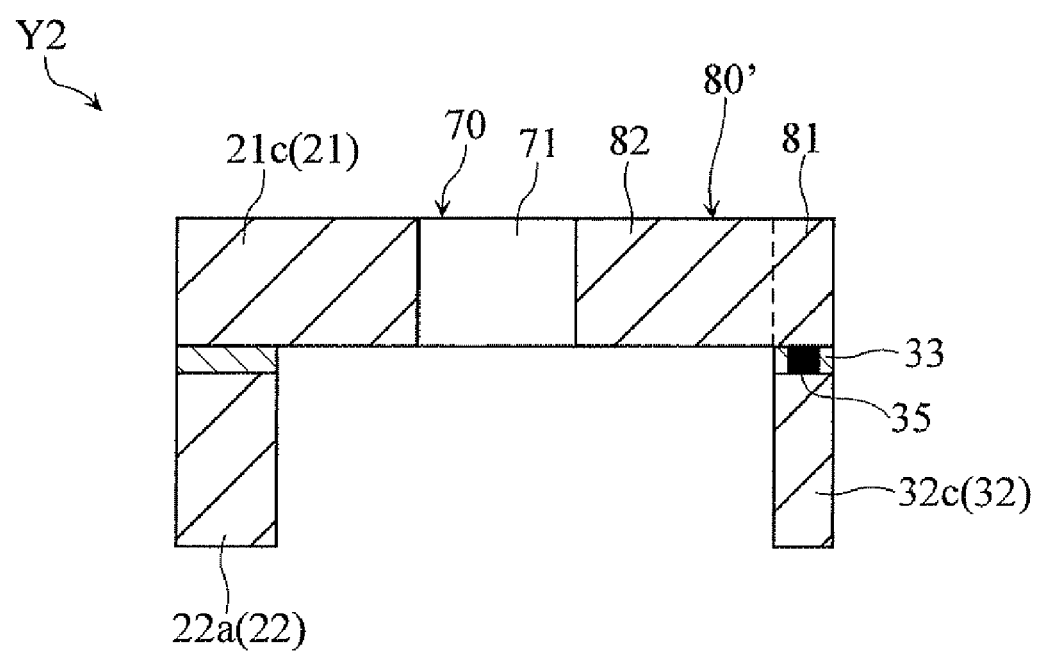
FIG. 34 is an enlarged cross-sectional view along a line XXXIV-XXXIV in FIG. 25.

The electrode part 80' is a portion originating from the first silicon layer and includes an arm 81 and plural electrode teeth 82, as illustrated in FIG. 25. The arm 81 extends in the extending direction of the axis A2. The electrode teeth 82 extend from the arm 81 toward the electrode part 70 side and are spaced apart side by side in a direction in which the arm 81 extends. In this way, the electrode part 80' has a comb-teeth electrode structure. Further, the arm 81 of the electrode part 80' is electrically coupled to the part 32c of the frame 30' via the electrically conductive via 35 penetrating the insulating layer 33, as illustrated in FIG. 34.

In the micro movable element Y2, the pair of the electrode parts 12 and 60 may form a driving mechanism or an actuator for generating the driving force associated with the rotation of the inner movable part 10 around the axis A1. Further, the pair of the electrode part 70 and 80 may form a driving mechanism or an actuator for generating the driving force associated with the translation of the frame 20 and thus the inner movable part 10 in the direction of the axis A1.

At the time of driving the micro movable element Y2, the reference potential is applied to the electrode part 12 of the inner movable part 10 and the electrode part 70. The reference potential may be applied to the electrode part 12 via a part of the part 31a of the first layer part 31 of the frame 30', the coupling part 50D, the part 21c of the first layer part 21 of the frame 20, the electrically conductive vias 26 (illustrated in FIG. 33), the part 22a of the second layer part 22 of the frame 20, the electrically conductive vias 24 (illustrated in FIG. 31), the part 21a of the first layer part 21 of the frame 20, the torsion bars 41 of the coupling parts 40, and the beam part 13 of the inner movable part 10. The reference potential may be applied to the electrode part 70 via a part of the part 31a of the first layer part 31 of the frame 30', the coupling part 50D, and the part 21c of the first layer part 21 of the frame 20. A portion (a reference potential applied part) of the part 31a of the first layer part 31 of the frame 30' to which the reference potential is applied is spaced apart from other portion of the part 31a to be electrically isolated therefrom. The reference potential is ground potential, for example. Preferably, the reference potential is kept constant.

At the time of driving the micro movable element Y2, the driving potential higher than the reference potential is applied to the electrode part 60, as necessary. The application of the driving potential to the electrode part 60 generates electrostatic attraction between the electrode parts 12 and 60 and thus enables the inner movable part 10 to rotate around the axis A1. The driving potential may be applied to the electrode part 60 via the part 32b of the second layer part 32 of the frame 30', the electrically conductive vias 34 (illustrated in FIG. 32), the part 31b of the first layer part 31 of the frame 30', the coupling part 50C, the part 21b of the first layer part 21 of the frame 20, the electrically conductive vias 25 (illustrated in FIG. 31), and the part 22b of the second layer part 22 of the frame 20. Such driving can switch the reflecting direction of the light reflected by the mirror surface 11' on the land part 11 of the micro movable element Y2, as appropriate.

At the time of driving the micro movable element Y2, the driving potential higher than the reference potential is applied to the electrode part 80', as necessary. The application of the driving potential to the electrode part 80' generates electrostatic attraction between the electrode parts 70 and 80 and thus enables the frame 20 and thus the land part 11 (the mirror surface 11') of the inner movable part 10 to perform the translational movement in the direction of the axis A2. The driving potential may be applied to the electrode part 80' via the part 32c of the second layer part 32 of the frame 30' and the electrically conductive via 35 (illustrated in FIG. 34).

Figure 35:
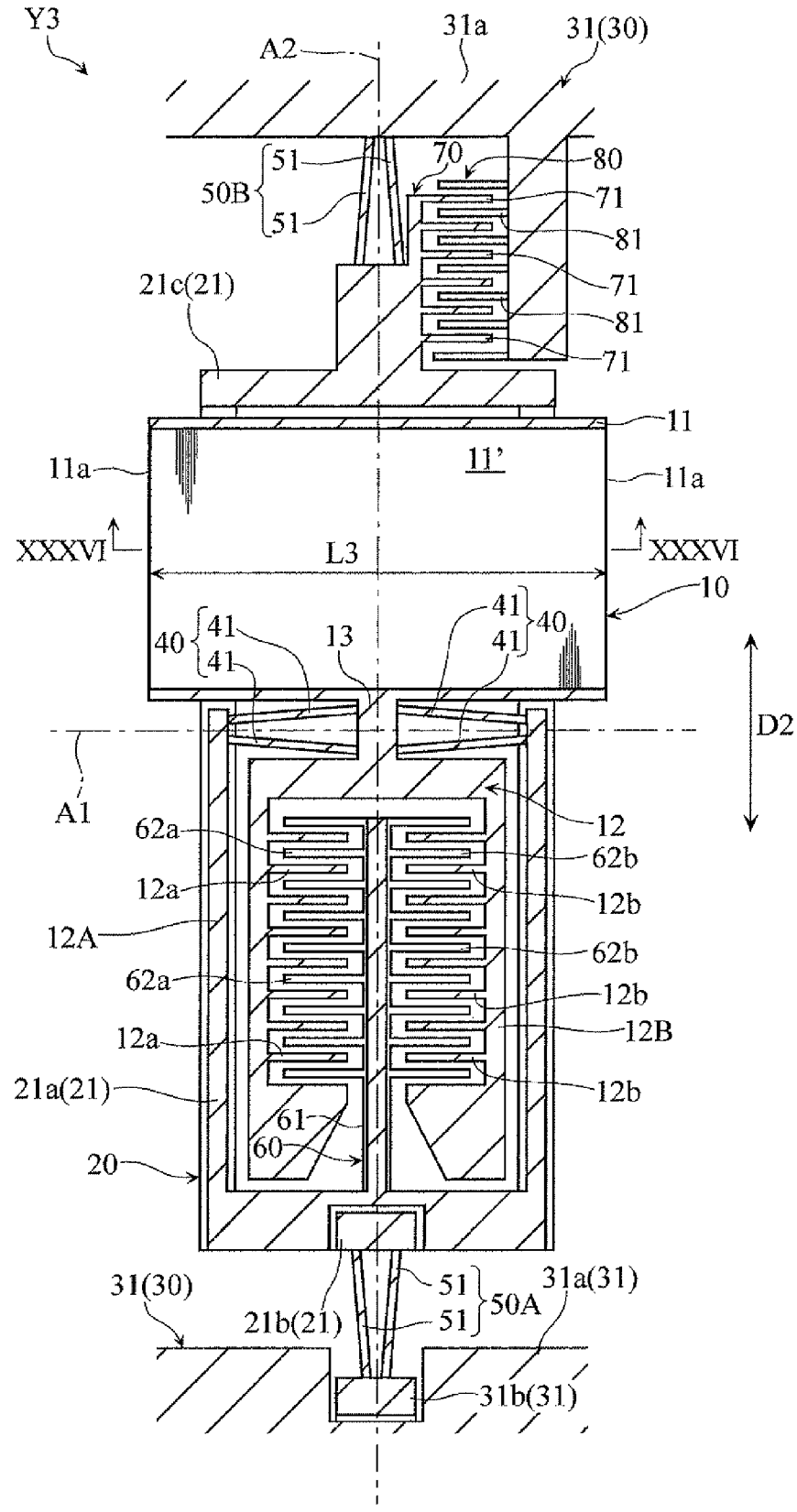
FIG. 35 is a plane view of a micro movable element included in the second array in the second embodiment.
Figure 36:
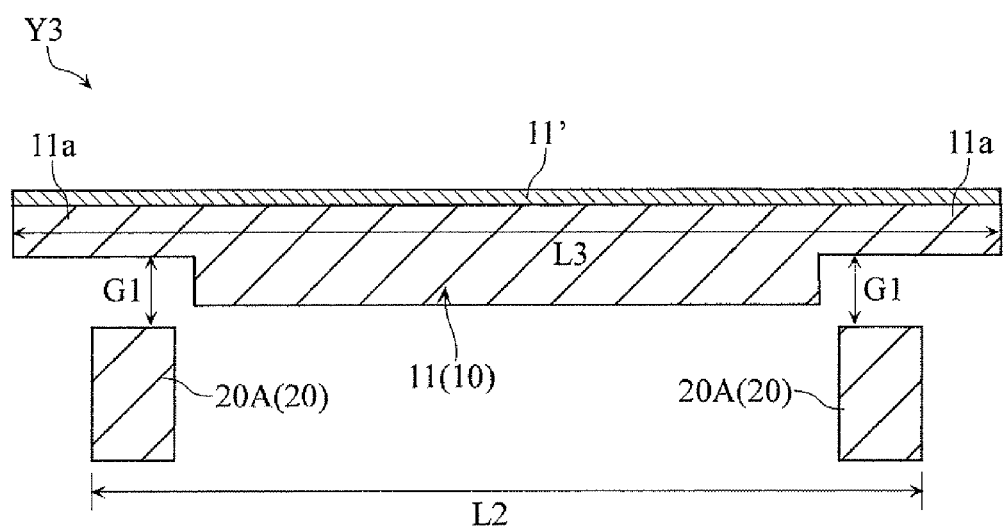
FIG. 36 is an enlarged cross-sectional view along a line XXXVI-XXXVI in FIG. 35.

FIGS. 35 and 36 illustrate the micro movable elements Y3 included in the second array 7. FIG. 35 is a plane view of the micro movable element Y3. FIG. 36 is an enlarged cross-sectional view along a line XXXVI-XXXVI in FIG. 35.

The micro movable element Y3 is a micro-mirror element in the embodiment and includes an inner movable part 10, a frame 20 as an outer movable part, a frame 30 as a stationary part, a pair of coupling parts 40, a pair of coupling parts 50A and 50B, electrode parts 60, 70 and an electrode part 80. The length of the land part 11 or the mirror surface 11' of the inner movable part 10 of the micro movable element Y3 in the direction of the axis A1 is longer than that of the micro movable element Y1. The length L3 of the land part 11 or the mirror surface 11' of the inner movable part 10 of the micro movable element Y3 is within a range from 50 μm to 500 μm, for example, as long as it is greater than the length L1 in the micro movable element Y1. In the micro movable element Y3, the length L3 of the land part 11 or the movable main part is greater than the length L2 between the outer ends of the extended parts 20A as illustrated in FIG. 36. The other configuration of the micro movable element Y3 may be the same as the micro movable element Y1. Further, the micro movable element Y3 is manufactured by processing a material substrate which is the SOC wafer using the MEMS technique, as is the case with the micro movable element Y1. The material substrate has a multilayered structure which includes a first silicon layer, a second silicon layer and an insulating layer between the first and second first silicon layers. The silicon layers have impurities doped therein to have a predetermined electrical conductivity. The respective parts of the micro movable element Y3 mainly originate from the first silicon layer and/or the second silicon layer. For the sake of clarity of a drawing, in FIG. 35, the parts originating from the first silicon layer are indicated by oblique line hatchings.

At the time of driving the respective micro movable elements Y3, the reference potential is applied to the electrode parts 12 of the inner movable parts 10 and the electrode parts 70. The electrical path for applying the reference potential to the electrode parts 12 and 70 is the same as the one described above with reference to the driving of the micro movable element Y1. The reference potential is ground potential, for example. Preferably, the reference potential is kept constant.

At the time of driving the micro movable element Y3, the driving potential higher than the reference potential is applied to the electrode parts 60 and 80, respectively, as necessary. The application of the driving potential to the electrode part 60 generates electrostatic attraction between the electrode parts 12 and 60 and thus enables the inner movable part 10 to rotate around the axis A1. The application of the driving potential to the electrode part 80 generates electrostatic attraction between the electrode parts 70 and 80 and thus enables the frame 20 and thus the inner movable part 10 to rotate around the axis A2. The micro movable element Y3 is a so-called oscillating element in two axes. The electrical path for applying the driving potential to the electrode parts 60 and 80 is the same as the one described above with reference to the driving of the micro movable element Y1. Such driving in the two axes can switch the reflecting direction of the light reflected by the mirror surface 11' on the land part 11 of the micro movable element Y3, as appropriate.

The first array 6 includes plural micro movable elements Y2, as illustrated in FIGS. 21-23. In the first array 6, the micro movable elements Y2 are aligned in a row in the extending direction of the axis A1 such that all the axes A2 (not illustrated in FIGS. 21-23) are parallel with each other. In the first array 6, the frame 30' of the respective micro movable elements Y2 is an integrated frame body which surrounds the first movable parts (i.e., the inner movable parts 10, the frames 20, the coupling parts 40 and the electrode parts 60) of all the micro movable elements Y2. The first movable parts of all the micro movable elements Y2 in the first array 6 form a first movable part row. In the first movable part row, the first movable parts are aligned in a row such that the land parts 11 including the mirror surfaces 11' (i.e. the movable main parts) and gaps G2 are located alternately and the movable main parts are aligned in a row in an arrangement direction D1 of the first movable parts. In the embodiment, in the first movable part row, the length L1 of the land part 11 or the mirror surface 11' in the arrangement direction D1 is set to be the same as the gap G2. Thus, in the embodiment, the population of the land parts 11 or the mirror surfaces 11' in the arrangement direction D1 within the frame 30' of the first array 6 is about 50 percent. The population in the first array 6 may be set to different values. Further, in the first array 6, the reference potential applied part of the part 31a of the first layer part 31 of the frame 30' is continuous over all the micro movable elements Y2. The electrode parts 12 and the shield parts 14 of the inner movable parts 10, the parts 21a and 21c of the first layer parts 21 and the parts 22a of the second layer parts 22 of the frames 20, the parts 32c of the second layer part 32 of the frame 30' and the electrode parts 70 of all the micro movable elements Y2 of the first array 6 are electrically coupled.

The second array 7 includes plural micro movable elements Y3, as illustrated in FIGS. 21, 22 and 24. In the second array 7, the micro movable elements Y3 are aligned in a row in the extending direction of the axis A1 such that all the axes A2 (not illustrated in FIGS. 21, 22 and 24) are parallel with each other. In the second array 7, the frame 30 of the respective micro movable elements Y3 is an integrated frame body which surrounds the second movable parts (i.e., the inner movable parts 10, the frames 20, the coupling parts 40 and the electrode parts 60) of all the micro movable elements Y3. The second movable parts of all the micro movable elements Y3 in the second array 7 form a second movable part row. In the second movable part row, the second movable parts are aligned in a row such that the respective land parts 11 including the mirror surfaces 11' (i.e. the movable main parts) are opposed to the corresponding one of the gaps G2 of the first movable part row and the movable main parts are aligned via the gaps G3 in a row in an arrangement direction D1. Further, in the second movable part row, the movable main parts and the gaps G3 are located alternately. If in the second movable part row the length L3 of the land part 11 or the mirror surface 11' in the arrangement direction D1 is set to be the same as the gap G3, the population of the land parts 11 or the mirror surfaces 11' in the arrangement direction D1 within the frame 30 of the second array 7 is about 50 percent. The population in the second array 7 may be set to different values. The length L1 of the land part 11 (or the mirror surface 11') of the second array 7 may be set such that opposite ends of the respective land parts 11 (or the mirror surface 11') of the second array 7 in the arrangement direction D1 overlap the land parts 11 (or the mirror surface 11') of the first array 6. In this case, in the second array 7, G3 is smaller than L3 and the population of the land parts 11 or the mirror surfaces 11' in the arrangement direction D1 within the frame 30 of the second array 7 is greater than 50 percent. Further, in the second array 7, the reference potential applied part of the part 31a of the first layer part 31 of the frame 30 is continuous over all the micro movable elements Y3. The electrode parts 12 and the shield parts 14 of the inner movable parts 10, the parts 21a and 21c of the first layer parts 21 and the parts 22a of the second layer parts 22 of the frames 20, the parts 32c of the second layer part 32 of the frame 30 and the electrode parts 70 of all the micro movable elements Y3 of the second array 7 are electrically coupled.

The base part 3 includes a reference potential wiring and plural pairs of driving wirings (first driving wirings and second driving wirings). The reference potential wiring is electrically coupled to the reference potential applied parts of the parts 31a of the first layer parts 31 of the frames 30' and 30 of the first and second arrays 6 and 7. The first driving wirings are electrically coupled to the electrode parts 60 of the micro movable elements Y2 of the first array 6 and the electrode parts 60 of the micro movable elements Y3 of the second array 7. The second driving wirings are electrically coupled to the electrode parts 80' of the micro movable elements Y2 of the first array 6 and the electrode parts 80 of the micro movable elements Y3 of the second array 7. A concrete example is as follows.

In the first array 6, the reference potential applied parts of the parts 31a of the first layer part 31 of the frame 30' are electrically coupled to a part (reference potential applied parts) of the parts 32a of the second layer part 32 of the frame 30' via predetermined electrically conductive vias (not illustrated) penetrating the insulating layer 33 of the frame 30'. The reference potential applied parts of the parts 32a are coupled to at least one of the spacers 4 of the electrically conductive material which in turn is coupled to the reference potential applied parts of the parts 31a of the first layer part 31 of the frame 30 of the second array 7. Thus, the reference potential applied parts of the parts 31a of the first layer part 31 of the frame 30' of the first array 6 are electrically coupled to the reference potential applied parts of the parts 31a of the first layer part 31 of the frame 30 of the second array 7. Further, in the second array 7, the reference potential applied parts of the parts 31a of the frame 30 are electrically coupled to a part (reference potential applied parts) of the parts 32a of the frame 30 via predetermined electrically conductive vias (not illustrated) penetrating the insulating layer 33 of the frame 30. The reference potential applied parts of the parts 32a are coupled to at least one of the spacers 5 of the electrically conductive material which in turn is coupled to a part (i.e., the reference potential wiring) of the wirings of the base part 3. Thus, the reference potential applied parts of the parts 31a of the first layer parts 31 of the frames 30' and 30 of the first and second arrays 6 and 7 are electrically coupled to the reference potential wiring of the base part 3.

The parts 32b of the second layer part 32 of the frame 30' of the micro movable elements Y2 of the first array 6 (which are electrically coupled to the electrode parts 60 of the corresponding micro movable elements Y2) are coupled to the spacers 4 which are made from the electrically conductive material. The spacers 4 are coupled to a part (first driving potential applied parts) of the parts 31a of the first layer part 31 of the frame 30 of the second array 7. In the second array 7, the first driving potential applied parts of the parts 31a of the first layer part 31 of the frame 30 are electrically coupled to a part (first driving potential applied parts) of the parts 32a of the second layer part 32 of the frame 30 via predetermined electrically conductive vias (not illustrated) penetrating the insulating layer 33 of the frame 30. The first driving potential applied parts of the parts 32a are coupled to the spacers 5 of the electrically conductive material which in turn are coupled to one of the first driving wirings of the base part 3. Thus, the parts 32b and thus the electrode parts 60 of the micro movable elements Y2 of the first array 6 are electrically coupled to one of the first driving wirings of the base part 3.

The parts 32c of the second layer part 32 of the frame 30' of the micro movable elements Y2 of the first array 6 (which are electrically coupled to the electrode parts 80' of the corresponding micro movable elements Y2) are coupled to the spacers 4 which are made from the electrically conductive material. The spacers 4 are coupled to a part (second driving potential applied parts) of the parts 31a of the first layer part 31 of the frame 30 of the second array 7. In the second array 7, the second driving potential applied parts of the parts 31a of the first layer part 31 of the frame 30 are electrically coupled to a part (second driving potential applied parts) of the parts 32a of the second layer part 32 of the frame 30 via predetermined electrically conductive vias (not illustrated) penetrating the insulating layer 33 of the frame 30. The second driving potential applied parts of the parts 32a are coupled to the spacers 5 of the electrically conductive material which in turn are coupled to one of the second driving wirings of the base part 3. Thus, the parts 32c and thus the electrode parts 80' of the micro movable elements Y2 of the first array 6 are electrically coupled to one of the second driving wirings of the base part 3.

The parts 32 of the second layer part 32 of the frame 30 of the micro movable elements Y3 of the second array 7 (which are electrically coupled to the electrode parts 60 of the corresponding micro movable elements Y3) are coupled to the spacers 5 which are made from the electrically conductive material. The spacers 5 are coupled to one of the first driving wirings of the base part 3. Thus, the parts 32b and thus the electrode parts 60 of the micro movable elements Y3 of the second array 7 are electrically coupled to one of the first driving wirings of the base part 3.

The electrode parts 80 of the micro movable elements Y3 of the second array 7 are coupled to the spacers 5 which are made from the electrically conductive material. The spacers 5 are coupled to one of the second driving wirings of the base part 3. Thus, the electrode parts 80 of the micro movable elements Y3 of the second array 7 are electrically coupled to one of the second driving wirings of the base part 3.

Specifically, the electrical coupling relationships described above are formed between the reference potential applied parts (including the electrode parts 12 and 70) and the electrode parts 60, 80 and 80' of the micro movable elements Y2 and Y3 of the micro movable element array X2 and the reference potential wiring and the pairs of the driving wirings.

The reference potential is commonly applied to the electrode parts 12 of the inner movable parts 10 and the electrode parts 70 of all the micro movable elements Y2 and Y3 at the time of driving the micro movable element array X2. In this state, the driving potential is applied to the respective electrode parts 60 and 80' of the selected micro movable element Y2, as necessary. In the micro movable element Y2, the inner movable part 10 can be rotated around the axis A1 by the application of the driving potential to the electrode 60, and the land part 11 (and the mirror surface 11') of the inner movable part 10 can be translated in the direction of the axis A1 by the application of the driving potential to the electrode 80'. Further, the driving potential is applied to the respective electrode parts 60 and 80 of the selected micro movable element Y3, as necessary. In this way, in the respective micro movable elements Y2, the inner movable parts 10 (including the land parts 11 with the mirror surfaces 11') are operated to oscillate, and the frames 20 and thus the inner movable parts 10 (including the land parts 11 with the mirror surfaces 11') are operated to oscillate. According to the micro movable elements Y2, it is possible to switch the reflecting direction of the light reflected by the mirror surfaces 11' on the land parts 11 of the micro movable elements Y2 and Y3, as appropriate.

According to the micro movable element array X2 having the configuration described above, the first array 6 or the frame 30' thereof and the second array 7 or the frame 30 thereof are multilayered via the spacers 4. As illustrated in FIG. 23, the first movable parts (including the inner movable parts 10 and the frames 20) of the micro movable elements Y2 are supported by the frame 30' of the first array 6 such that the first movable parts form the first movable part row as described above.

On the other hand, as illustrated in FIG. 24, the second movable parts (including the inner movable parts 10 and the frames 20) of the micro movable elements Y3 are supported by the frame 30 of the second array 7 such that the second movable parts form the second movable part row as described above. In the second movable part row, as described above, the second movable parts are aligned in a row such that the respective land parts 11 including the mirror surfaces 11' (i.e. the movable main parts) are opposed to the corresponding one of the gaps G2 of the first movable part row and the movable main parts are aligned via the gaps G3 in a row in an arrangement direction D1.

In the micro movable element array X1, one of two neighboring movable parts in the arrangement direction D1 is located on the first array 6 and another is located on the second array 7, wherein the neighboring movable parts are shifted (offset) in the multilayered direction of the first and second array 6 and 7, as illustrated in FIG. 22. Further, two neighboring movable main parts (the first and second movable main parts) in the arrangement direction D1 are also shifted in the multilayered direction of the first and second array 6 and 7. According to the micro movable element array X2, it is possible to arrange the movable main parts (the first and second movable main parts) of the two neighboring movable parts in the arrangement direction D1 such that they are close to each other in spite of the processing limit while preventing the mechanical and electrical interference between two neighboring movable parts. Therefore, the micro movable element array X2 can implement high population of the movable main parts (the land parts 11 including the mirror surfaces 11', in the embodiment) in the arrangement direction D1 or movable part arrangement direction. The higher the population of the land parts 11 or the mirror surfaces 11' in the arrangement direction D1, the more the loss can be reduced with respect to the optical signals received by the micro movable element array X2 as a whole and reflected by the mirror surfaces 11'. In the micro movable element array X2, it is possible to implement greater than or equal to 99 percent, that is to say, substantially 100 percent of the population of the land parts 11 or the mirror surfaces 11' in the arrangement direction D1. It is assumed that the micro movable element array X2 is used as a wavelength selective switch in the WDM communication system. In this case, in the micro movable element array X2, it is possible to set a great wavelength band or frequency band by setting the wavelength band or the frequency band without interruption with respect to the optical signals as reflecting target signals allocated for the respective mirror surfaces 11'. Further, in this case, it is possible to increase the wavelength band or the frequency band of the allocated optical signal of the reflecting target with respect to the selected micro movable element Y3 by driving the translation of a micro movable element adjacent to the selected micro movable element Y3 as illustrated by an arrow D3 in FIG. 22. In the micro movable element array X2, it is possible to increase the wavelength band or the frequency band of the allocated optical signals of the reflecting target with respect to the respective micro movable element Y3.

In the respective micro movable elements Y2 of the micro movable element array X2, the electrode parts 12 of the inner movable part 10, the shield parts 14, the parts 22a of the second layer parts 22 of the frames 20, and the parts 32c of the second layer part 32 of the frame 30' are electrically coupled. Thus, the reference potential (for example, ground potential)

is applied to the shield parts 14, the parts 22a and 32c as well as the electrode parts 12 at the time of driving the micro movable element Y1. Therefore, the electric field generated from the electrode parts 60 toward the land parts 11 side of the inner movable part 10, for example, due to the driving potential higher than the reference potential at the time of driving is easily absorbed by the shield parts 14. In other words, it is difficult for the electric field to go beyond the shield parts 14 to reach the land parts 11, for example. Further, the electric field generated from the electrode parts 60 at the time of driving is easily absorbed by the parts 22a. In other words, it is difficult for the electric field to go beyond the parts 22a side of the second layer parts 22 of the frames 20 to leak out of the elements. Further, the electric field generated from the electrode parts 80' to the side opposite to the electrode parts 70 due to the driving potential higher than the reference potential at the time of driving is easily absorbed by the parts 32c. In other words, it is difficult for the electric field to go beyond the parts 32c to leak out of the elements. These electric field absorption effects reduce or prevent the leak of the electric field out of the elements of the micro movable elements Y2. Because of the reduction or prevention of the leak of the electric field out of the elements, it is possible to prevent the electric field leaked from the driving mechanisms (electrode parts 12, 60, 70 and 80') of the respective micro movable element Y2 from affecting the driving property of other adjacent micro movable element Y2. Therefore, the electric field absorption effects contribute to increased density of the micro movable element Y2 in the arrangement direction and thus improved population of the movable main parts (the land parts 11 and the mirror surfaces 11') in the arrangement direction.

The micro movable elements Y2 of the micro movable element array X2 can be sensing devices such as an angular sensor or an acceleration sensor. In the case of the micro movable elements Y2 being the sensing devices, the mirror surfaces 11' are not necessarily provided on the land parts 11 of the inner movable parts 10.

The micro movable elements Y1 and Y3 included in the micro movable element arrays X1 and X2 may be so-called oscillating elements in a single axis. If the micro movable elements Y1 and Y3 are oscillating elements in a single axis, a configuration is preferably adopted in which the electrode parts 70 and 80 are omitted and the frame 20 is secured to the frame 30.

The micro movable element array X1 and X2 may be adopted as a micro-mirror element array for forming an optical switching apparatus included in a communication apparatus.

Figure 37:
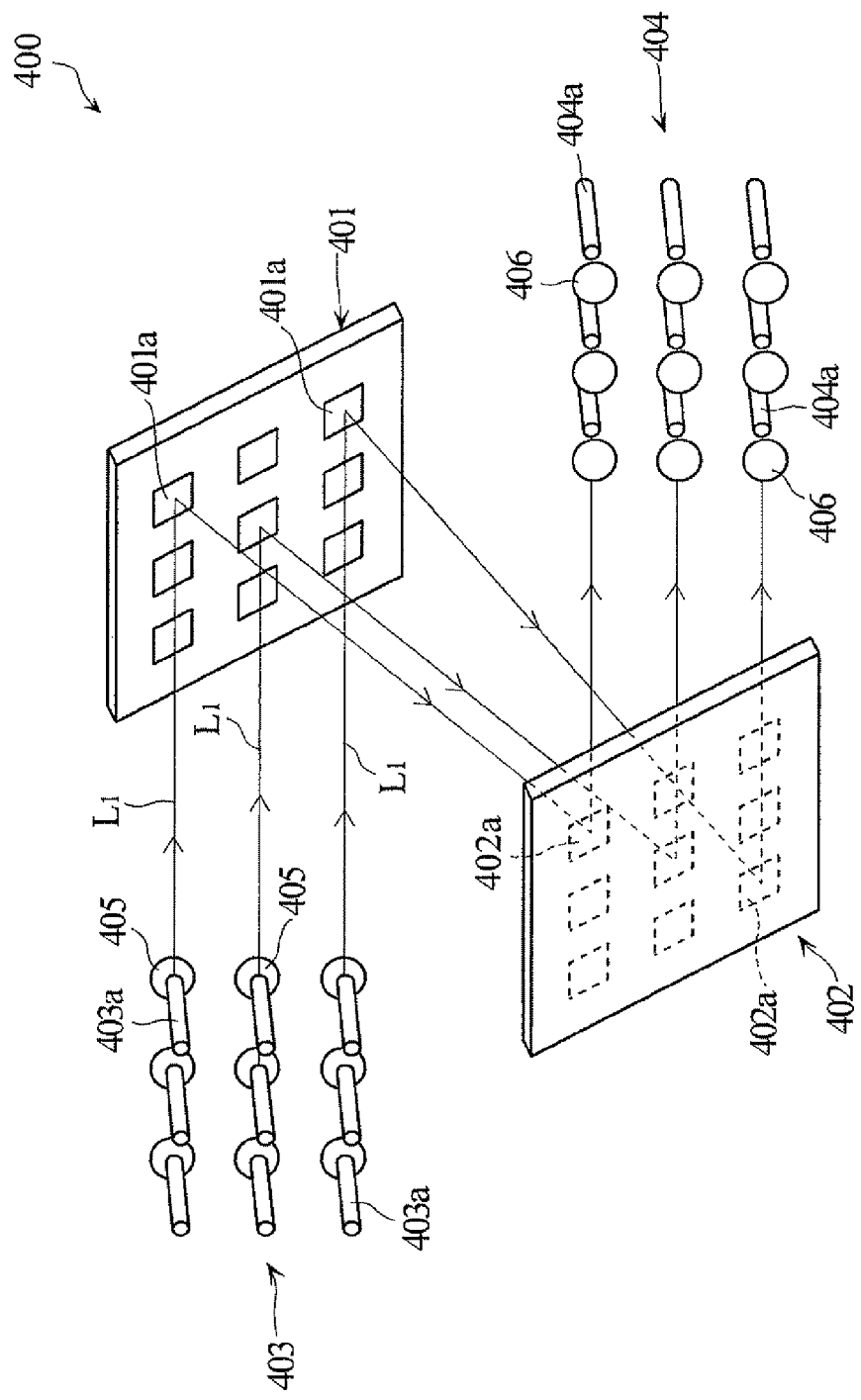
FIG. 37 is a diagram illustrating a schematic configuration of a light switching apparatus according to a third embodiment.

FIG. 37 is a diagram illustrating a schematic configuration of a light switching apparatus 400 of a spatial light coupling type according to a third embodiment. The light switching apparatus 400 includes a pair of a micro-mirror element array units 401 and 402, an input fiber array 403, an output fiber array 404 and a plural micro lenses 405 and 406. The input fiber array 403 is formed by a predetermined number of input fibers 403a, and the micro-mirror element array unit 401 has plural micro-mirror elements 401a arranged therein which are associated with the corresponding input fibers 403a. The output fiber array 404 is formed by a predetermined number of output fibers 404a, and the micro-mirror element array unit 402 has plural micro-mirror elements 402a arranged therein which are associated with the corresponding output fibers 404a. The micro-mirror elements 401a and 402a include the mirror surfaces for reflecting the light and are provided such that the orientations of the mirror surfaces can be controlled, respectively. The micro mirror array units 401 and 402 are one of the micro-mirror element arrays X1 and X2. The micro lenses 405 are disposed such that they are opposed to the ends of the input fibers 403a, respectively. Further, the micro lenses 406 are disposed such that they are opposed to the ends of the output fibers 404a, respectively.

In the light switching apparatus 400, the light beams L1 emitted from the input fibers 403a are made parallel with each other by passing through the corresponding micro lenses 405 and head to the micro-mirror element array unit 401. The light beams L1 are reflected by the corresponding micro-mirror elements 401a to be deflected toward the micro-mirror element array unit 402. At that time, the mirror surfaces of the micro-mirror elements 401a are directed to predetermined directions in advance so as to make the light beams L1 be input to the respective desired micro-mirror elements 402a. Then, the light beams L1 are reflected by the micro-mirror elements 402a to be deflected to the output fiber array 404. At that time, the mirror surfaces of the micro-mirror elements 402a are directed to predetermined directions in advance so as to make the light beams L1 be input to the respective desired output fibers 404a.

In this way, according to the light switching apparatus 400, the light emitted from the respective input fibers 403a reach the desired output fibers 404a by the deflections in the micro-mirror element array units 401 and 402. In other words, the input fibers 403a are coupled to the output fibers 404a in a one-to-one relationship. By changing the deflection angles in the micro-mirror element array units 401 and 402, as appropriate, the output fibers 404a to which the light beams L1 reach are switched.

The properties required for the light switching apparatus for switching the transmission path of the optical signals via the optical fibers from one fiber to another are large-capacity, high-speed, high reliability, etc., in the switching operations. From this viewpoint, it is preferred that the switching elements included in the light switching apparatus are micro-mirror elements formed using the MEMS technique. This is because the micro-mirror elements are suited for obtaining the required properties described above because it is possible to perform switching processes using the optical signals as they are (i.e., without converting the optical signals into the electrical signals) between the optical transmission path on the input side and the optical transmission path on the output side in the light switching apparatus.

Figure 38:
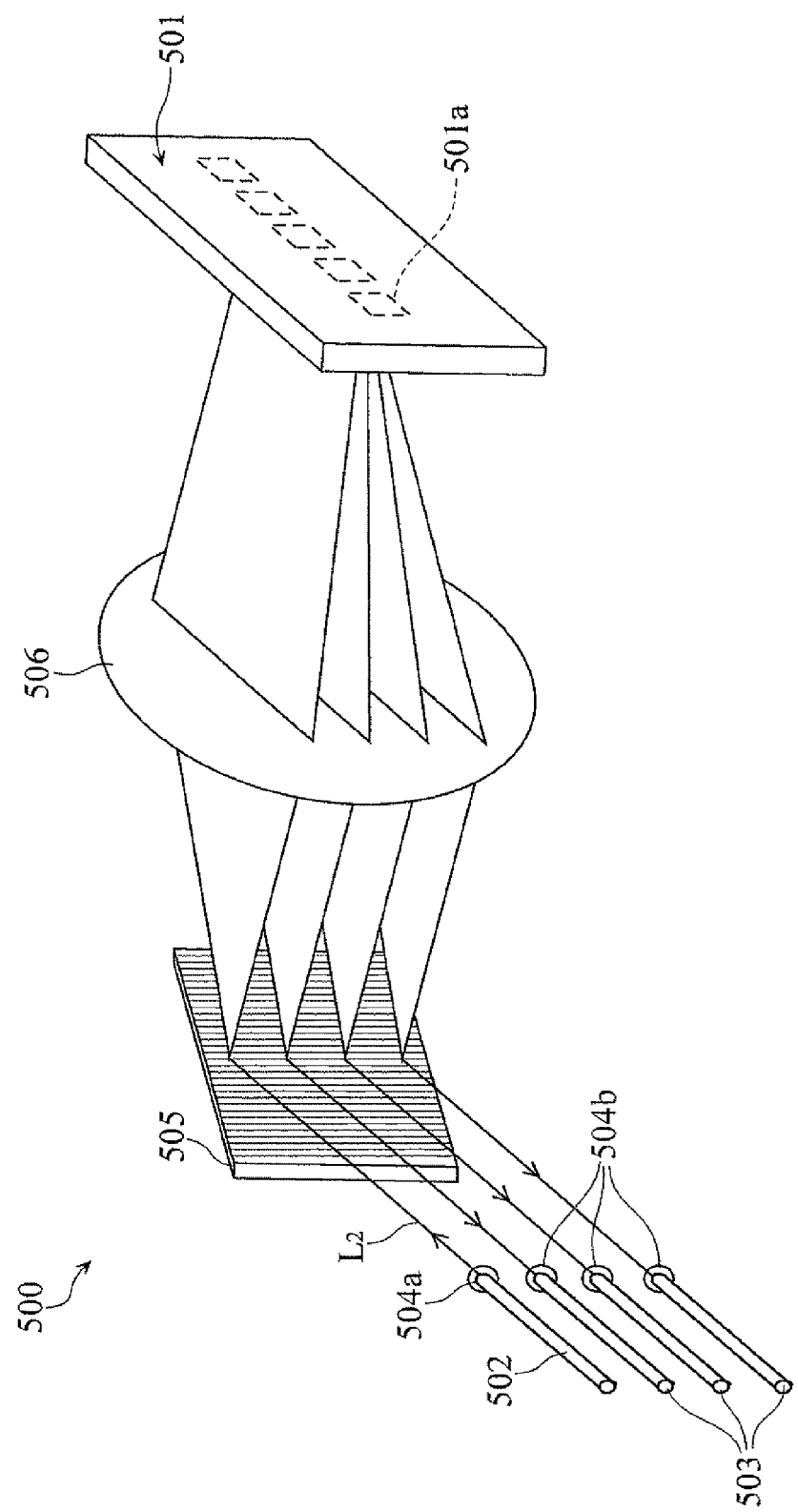
FIG. 38 is a diagram illustrating a schematic configuration of a light switching apparatus according to a fourth embodiment.
Figure 39:
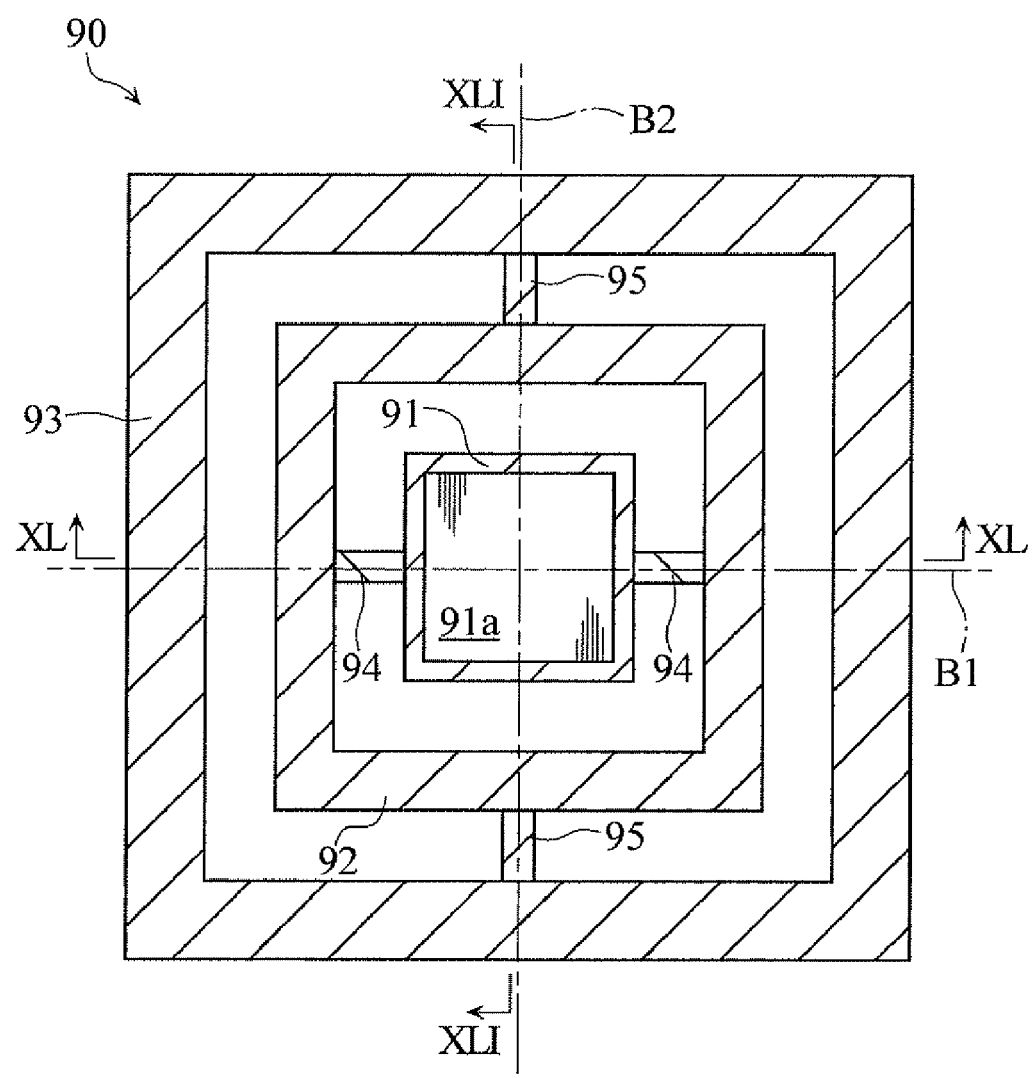
FIG. 39 is a plane view of a micro movable element according to related art.
Figure 40:
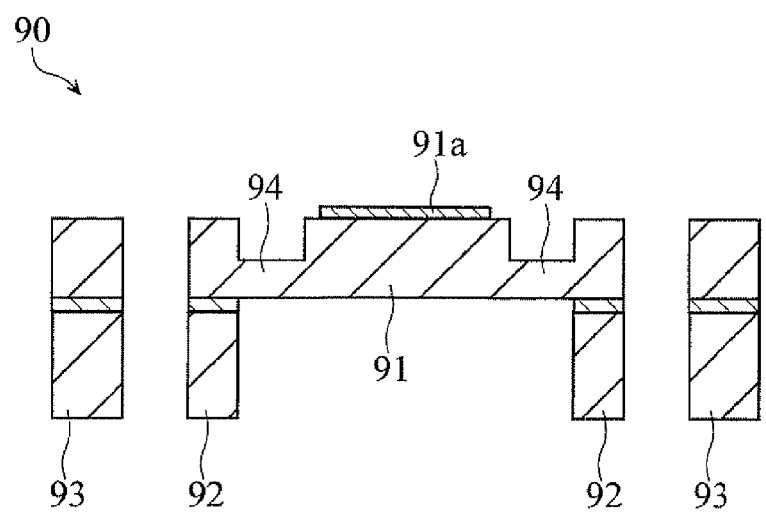
FIG. 40 is a cross-sectional view along a line XL-XL in FIG. 39.
Figure 41:
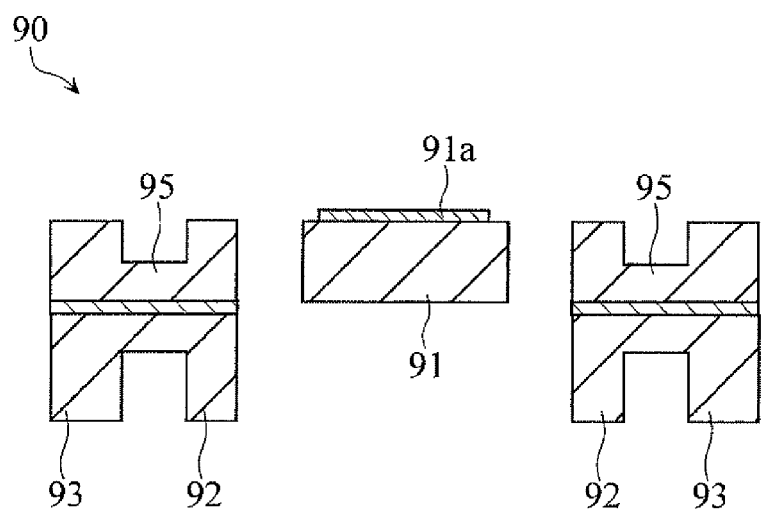
FIG. 41 is a cross-sectional view along a line XLI-XLI in FIG. 39.

FIG. 38 is a diagram illustrating a schematic configuration of a light switching apparatus 500 of a wavelength-selective type according to a fourth embodiment. The light switching apparatus 500 includes a micro-mirror array unit 501, an input fiber 502, three output fibers 503, plural micro lenses 504a and 504b, a spectrograph 505, and a condenser lens 506. The micro-mirror array unit 501 includes plural micro-mirror elements 501a. The micro-mirror elements 501a are arranged in a row, for example, in the micro-mirror array unit 501. The micro movable elements 501a include the mirror surfaces for reelecting the light and are provided such that the orientations of the mirror surfaces can be controlled. The micro mirror array unit 501 is one of the micro movable element arrays X1 and X2. The micro lens 504a is disposed such that it is opposed to the end of the input fiber 502. The micro lenses 504b are disposed such that they are opposed to the end of the output fibers 503. The spectrograph 505 is a reflection diffraction grating in which a diffraction angle of the reflected light varies with the wavelengths.

In the light switching apparatus 500, the light L2 (including plural wavelengths mixed) emitted from the input fiber 502 is made parallel by passing through the micro lenses 504a. The light L2 is reflected by the spectrograph 505. At that time, light L2 is reflected at the diffraction angle which varies with the wavelength. The reflected light passes through the condenser lens 506. At that time, the reflected light is collected to the corresponding micro-mirror elements 501a in the micro-mirror array unit 501 on a wavelength basis. The light with the respective wavelengths is reflected in predetermined directions by the corresponding micro-mirror elements 501a. At that time, the mirror surfaces of the micro-mirror elements 501a are directed to predetermined directions in advance so as to make the light with the corresponding wavelengths reach the desired output fibers 503. Then, the light reflected by the micro-mirror elements 501a is input to the selected predetermined output fibers 503 via the condenser lens 506, the spectrograph 505 and the micro lenses 504b. In this way, according to the light switching apparatus 500, it is possible to select the light with the desired wavelength from the light L2.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A micro movable element array comprising:
a first frame;
a first movable part row including plural first movable parts, the first movable parts including first movable main parts and being supported by the first frame;
a second frame; and
a second movable part row including plural second movable parts, the second movable parts including second movable main parts and being supported by the second frame, wherein
the first and second frames are stacked such that the first and second movable part rows are opposed to each other,
in the first movable part row, the first movable parts are located such that the first movable main parts are arranged in a first direction and the first movable main parts and gaps are disposed alternately in the first direction,
in the second movable part row, the second movable parts are located such that the second movable main parts are arranged in the first direction and the second movable main parts are opposed to the corresponding gaps, and
wherein the first movable parts include light reflecting surfaces on sides of the first movable main parts, the sides being away from the second movable main parts, and the second movable parts include light reflecting surfaces on sides of the second movable main parts, the sides being opposed to the first movable main parts.

2. A micro movable element array comprising:
a first frame;
a first movable part row including plural first movable parts, the first movable parts including first movable main parts and being supported by the first frame;
a second frame; and
a second movable part row including plural second movable parts, the second movable parts including second movable main parts and being supported by the second frame, wherein
the first and second frames are stacked such that the first and second movable part rows are opposed to each other,
in the first movable part row, the first movable parts are located such that the first movable main parts are arranged in a first direction and the first movable main parts and gaps are disposed alternately in the first direction,
in the second movable part row, the second movable parts are located such that the second movable main parts are arranged in the first direction and the second movable main parts are opposed to the corresponding gaps,
wherein the first movable parts further include first electrode parts,
the second movable parts further include second electrode parts,
the micro movable element array further includes:
first torsion coupling parts coupling the first frame and the first movable parts, and defining axes of rotation of the first movable parts;
second torsion coupling parts coupling the second frame and the second movable parts, and defining axes of rotation of the second movable parts;
third electrode parts fixed to the first frame and configured to generate driving forces for the rotation of the first movable parts in cooperation with the first electrode parts; and
fourth electrode parts fixed to the second frame and configured to generate driving forces for the rotation of the second movable parts in cooperation with the second electrode parts.

3. A micro movable element array comprising:
a first frame;
a first movable part row including plural first movable parts, the first movable parts including first movable main parts and being supported by the first frame;
a second frame; and
a second movable part row including plural second movable parts, the second movable parts including second movable main parts and being supported by the second frame, wherein
the first and second frames are stacked such that the first and second movable part rows are opposed to each other,
in the first movable part row, the first movable parts are located such that the first movable main parts are arranged in a first direction and the first movable main parts and gaps are disposed alternately in the first direction,
in the second movable part row, the second movable parts are located such that the second movable main parts are arranged in the first direction and the second movable main parts are opposed to the corresponding gaps,
wherein the first movable parts further include:
fifth electrode parts;
first beam parts coupling the fifth electrode parts and the first movable main parts;
first movable frame parts;
third torsion coupling parts coupling the first movable frame parts and the first beam parts, and defining axes of rotation of the first movable main parts; and
sixth electrode parts fixed to the first movable frame parts and configured to generate driving forces for the rotation of the first movable main parts in cooperation with the fifth electrode parts; wherein the second movable parts further include:
seventh electrode parts;
second beam parts coupling the seventh electrode parts and the second movable main parts;

second movable frame parts;
fourth torsion coupling parts coupling the second movable frame parts and the second beam parts, and defining axes of rotation of the second movable main parts; and
eighth electrode parts fixed to the second movable frame parts and configured to generate driving forces for the rotation of the second movable main parts in cooperation with the seventh electrode parts.

4. The micro movable element array as claimed in claim 3, wherein portions of the first movable frame parts, which extend along the first movable main parts, are located on sides of the first movable frame parts and between ends of the first movable frame parts in the first direction, the sides being opposed to the second movable main parts.

5. A micro movable element array comprising:
a first frame;
a first movable part row including plural first movable parts, the first movable parts including first movable main parts and being supported by the first frame;
a second frame; and
a second movable part row including plural second movable parts, the second movable parts including second movable main parts and being supported by the second frame, wherein
the first and second frames are stacked such that the first and second movable part rows are opposed to each other,
in the first movable part row, the first movable parts are located such that the first movable main parts are arranged in a first direction and the first movable main parts and gaps are disposed alternately in the first direction,
in the second movable part row, the second movable parts are located such that the second movable main parts are arranged in the first direction and the second movable main parts are opposed to the corresponding gaps,
wherein the micro movable element array further comprises:
a base part;
plural first spacers provided between the first frame and the second frame; and
plural second spacers provided between the second frame and the base part, wherein
a part of the first frame is electrically coupled to the base part via at least one of the first spacers, a part of the second frame and at least one of the second spacers, and
another part of the second frame is electrically coupled to the base part via at least one of the second spacers.

6. A communication apparatus including a micro movable element array with plural light reflecting surfaces, wherein the micro movable element array includes
a first frame;
a first movable part row including plural first movable parts, the first movable parts including first mobile main parts and being supported by the first frame;
a second frame; and
a second movable part row including plural second movable parts, the second movable parts including second mobile main parts and being supported by the second frame; wherein
the first and second frames are stacked such that the first and second movable part rows are opposed to each other,
in the first movable part row, the first movable parts are located such that the first movable main parts are arranged in a first direction and the first movable main parts and gaps are disposed alternately, and the first movable parts include light reflecting surfaces on sides of the first movable main parts, the side being away from the second movable main parts, and
in the second movable part row, the second movable parts are located such that the second movable main parts are arranged in the first direction and the second movable main parts are opposed to the corresponding gaps, and the second movable parts include light reflecting surfaces on sides of the second movable main parts, the side being opposed to the first movable main parts.

* * * * *